(12) United States Patent
Leskovec et al.

(10) Patent No.: US 7,970,721 B2
(45) Date of Patent: Jun. 28, 2011

(54) LEARNING AND REASONING FROM WEB PROJECTIONS

(75) Inventors: Jurij Leskovec, Pittsburgh, PA (US); Susan T. Dumais, Kirkland, WA (US); Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1007 days.

(21) Appl. No.: 11/763,719

(22) Filed: Jun. 15, 2007

(65) Prior Publication Data

US 2008/0313119 A1 Dec. 18, 2008

(51) Int. Cl.
*G06F 17/00* (2006.01)
*G06N 5/02* (2006.01)

(52) U.S. Cl. ......................................................... 706/46
(58) Field of Classification Search ...................... 706/46
See application file for complete search history.

(56) References Cited

U.S. PATENT DOCUMENTS

| | | | |
|---|---|---|---|
| 5,471,611 A * | 11/1995 | McGregor | 1/1 |
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 6,112,203 A | 8/2000 | Bharat et al. | |
| 6,272,507 B1 | 8/2001 | Pirolli et al. | |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,732,088 B1 | 5/2004 | Glance | |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B2 | 1/2005 | Robarts et al. | |
| 7,076,483 B2 | 7/2006 | Preda et al. | |
| 7,117,206 B1 | 10/2006 | Bharat et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |

(Continued)

FOREIGN PATENT DOCUMENTS

JP 2005309998 A 11/2005

(Continued)

OTHER PUBLICATIONS

Andy Harter, et al., A Distributed Location System for the Active Office, IEEE Network, 1994, pp. 62-70.

(Continued)

*Primary Examiner* — Donald Sparks
*Assistant Examiner* — Vincent M Gonzales
(74) *Attorney, Agent, or Firm* — Lee & Hayes, PLLC

(57) ABSTRACT

A system and method that facilitates and effectuates making an inference related to objects of interest within a context. A web projection component can generate sub graphs by projecting objects of interest onto a web graph representing a superset or partially overlapping set of objects to the objects of interest. An inference component can provide inferences relating to the quality of the objects of interest, adjustments to the context, and patterns recognized from graphical properties of the sub graphs.

19 Claims, 14 Drawing Sheets

U.S. PATENT DOCUMENTS

| | | |
|---|---|---|
| 2002/0044152 A1 | 4/2002 | Abbott, III et al. |
| 2002/0052930 A1 | 5/2002 | Abbott et al. |
| 2002/0052963 A1 | 5/2002 | Abbott et al. |
| 2002/0054130 A1 | 5/2002 | Abbott, III et al. |
| 2002/0054174 A1 | 5/2002 | Abbott et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2002/0107827 A1* | 8/2002 | Benitez-Jimenez et al. .... 706/59 |
| 2002/0133483 A1 | 9/2002 | Klenk et al. |
| 2003/0046401 A1 | 3/2003 | Abbott et al. |
| 2003/0154476 A1 | 8/2003 | Abbott, III et al. |
| 2003/0167163 A1 | 9/2003 | Glover et al. |
| 2004/0260695 A1 | 12/2004 | Brill |
| 2005/0034078 A1 | 2/2005 | Abbott et al. |
| 2005/0071465 A1 | 3/2005 | Zeng et al. |
| 2005/0210042 A1 | 9/2005 | Goedken |
| 2005/0216533 A1 | 9/2005 | Berkhin |
| 2006/0064411 A1 | 3/2006 | Gross et al. |
| 2006/0074836 A1* | 4/2006 | Gardner et al. ................. 706/60 |
| 2006/0074870 A1 | 4/2006 | Brill et al. |
| 2006/0074973 A1 | 4/2006 | Platt |
| 2007/0033169 A1 | 2/2007 | Friedman |
| 2007/0061298 A1 | 3/2007 | Wilson et al. |
| 2007/0094210 A1* | 4/2007 | Craig et al. ..................... 706/50 |

FOREIGN PATENT DOCUMENTS

| | | |
|---|---|---|
| WO | 9800787 | 1/1998 |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, in Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of the First International Conference on the Practical Application of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of the First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May, 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 pages.

Robert M. Losee, Jr., Minimizing information overload: the ranking of electronic messages, Journal of Information Science 15, Elsevier Science Publishers B.V., 1989, pp. 179-189.

Jon Kleinberg, Authoritative sources in a hyperlinked environment. Technical Report RJ 10076, IBM, May 1997. http://citeseer.ist.psu.edu/kleinberg99authoritative.html.

Krishna Bharat and Monika Henzinger, Improved algorithms for topic distillation in hyperlinked environments. In Proc. 21st Int'l ACM SIGIR Conference, 1998. http://citeseer.ist.psu.edu/bharat98improved.html.

Jeromy Carrière and Rick Kazman, WebQuery: Searching and Visualizing the Web through Connectivity, Proceedings of WWW6, 1997, Computer Networks and ISDN Systems, vol. 29, Nos. 8-13, Sep. 30, 1997. http://cybermetrics.cindoc.csic.es/cybermetrics/pdf/24.pdf.

International Search Report & Written Opinion dated Nov. 18, 2008 for PCT Application Serial No. PCT/US2008/065654, 10 pages.

* cited by examiner

LEARNING AND REASONING FROM WEB PROJECTIONS

BACKGROUND

Advances in digital data storage mechanisms have allowed for the accumulation of large amounts of data. For instance, the ever reducing costs of network storage has allowed for exponential growth of internet accessible web documents. This massive accumulation of data presents a challenge to present meaningful information to users and systems.

Traditionally, users have relied on information retrieval systems such as web search engines that employ methods such as basic word counting to rank results and natural language processing to present alternate queries. When a user enters a query, they typically are provided results from a variety of sources that have varying degrees of relevancy to the user's actual information goal. For example, a user entering a search for Washington may get results related to the state of Washington, President George Washington, city of Washington D.C., George Washington University, Washington Post, and Washington Wizards. Furthermore, the results will vary in degree of relevancy to each of the topics. For example, some resulting documents may have casual references to President George Washington and others will have President George Washington as the main topic. While all of the results are legitimate possibilities, the user is likely only seeking information related to one of the topics or possibly a topic not included in the list above.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

In accordance with one or more aspects and corresponding disclosure thereof, various features are described in connection with utilizing web projections in conjunction with artificial intelligence models to make inferences related to objects of interest within a context. In one aspect, a dynamic or static set of objects searchable by an information retrieval system exists in a data store. A web graph is constructed where nodes represent objects and/or sets of objects, and edges connecting nodes represent unidirectional or bidirectional links between objects and/or sets of objects. Objects of interest can be projected on the web graph to extract a context sensitive sub-graph representing those objects of interest found in the web graph. Graphical properties of the sub graph are developed and used by an artificial intelligence model to make an inference related to the objects of interests. In one aspect predictions related to context, content, relevance, and user behavior are inferred. In another aspect, graphical properties of the sub graph are developed and used to infer patterns, such as node clusters, loops, anomalies, linkage patterns, edge density, path length between nodes, and patterns matching or approximating stored reference patterns. Some example contexts delineating objects of interest are results from a user or system query, objects a user has previously viewed, pages on a website, newly added objects, objects above or below an occurrence threshold, objects that have recently changed, objects linked to a particular object, and objects downloaded within a period of time. The context can be defined by one or more users or systems, or can be inferred.

In an aspect, web projections can be related to a set of internet accessible documents, such as web pages with edges representing interconnecting hyperlinks. In another aspect, web projections can be related to a help system, such as with nodes representing help topic documents and edges representing attributes such as help topic references on pages. Another aspect of web projections can be related to a research library, such as with nodes representing documents and edges representing attributes such as bibliographic references. Other aspects of web projections can relate, but are not limited to: a chemical structure data store with nodes representing chemical compositions and with edges representing attributes such as whole or partial common chemical structures; a genetic structure data store, such as with nodes representing genetic structures and with edges representing attributes such as whole or partial common genetic structures; an astronomy data store, such as with nodes representing astrological objects and edges representing object attributes, such as common astrological features; a manufacturing system, with edges representing attributes, such as common parts between nodes representing manufactured items; a shopping application, with edges representing relationships between product attributes, retailer attributes, and/or prices; a video archive, with edges representing attributes between videos, such as common actors, directors, producers, or genre; an audio archive with edges representing attributes between audio objects, such as common speaker, artists, or genre; an image archive with edges representing attributes between images, such as common artist, style, locations, or subject; or a diagnostic tool, such as a medical diagnostic system, where nodes represent a diagnosed condition and edges represent symptoms that are common between diagnosed conditions.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
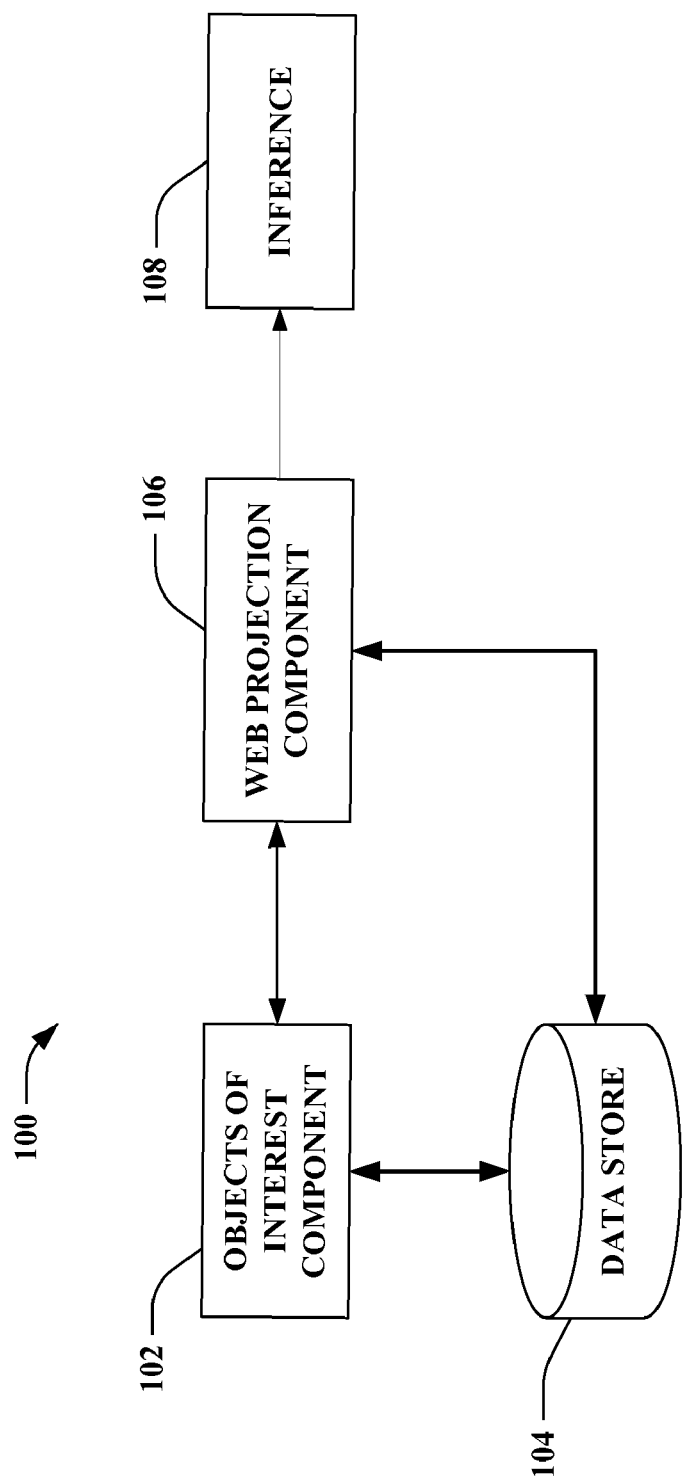
FIG. 1 illustrates a high-level block diagram of a system for employing a web projection based inference model in accordance with one aspect of the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

As used herein, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and a computer. By way of illustration, both an application running on a server and the server can be a component. One or more components can reside within a process and/or thread of execution and a component can be localized on one computer and/or distributed between two or more computers.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in construction of new events or actions from a set of observed events and/or stored event data, whether or not the events are correlated in close temporal proximity, and whether the events and data come from one or several event and data sources.

Throughout the discussion below, experimental results based on exemplary training sets of data are presented to further support or illustrate various aspects of the subject application. It should be appreciated and understood that such experiments are not intended to limit the scope of the systems and methods described herein to particular scenarios, operating conditions or applications but are provided as examples. Moreover, the subject application can be employed with respect to any type of searching performed on the Internet, on a remote or local server, storage facility, or on any computing device or network.

Referring to FIG. 1, there is illustrated a general block diagram system 100 employing one or more artificial intelligence models to make an inference related to a set of objects within a context. System 100 employs graphical properties of sub graphs projected on web graphs as input to the artificial intelligence models. System 100 includes objects of interest component 102 that generates or identifies a set of objects of interest from data store 104. Objects can include any of, but are not limited to, domains, web pages or Uniform Resource Locators (URL), images, videos, audio, documents, files, directories, data structures and the like. A context can employ any criteria to delineate objects of interest from a larger set of objects. Some example contexts delineating objects of interest are results from a user or system query, objects a user has previously viewed, pages on a website, newly added objects, objects above or below an occurrence threshold, objects that have recently changed, objects linked to a particular object, and objects downloaded within a period of time. The context can be defined by one or more users or systems, or can be inferred by the objects of interest component. The objects of interest component can employ artificial intelligence models to infer the context based upon, but not limited to, user or system defined profiles, observation of user or system activity, logged data, and data exchanged with local or remote systems.

Web projection component 106 constructs a web graph from all or part of the data in data store 104. The web graph has nodes representing objects and edges representing links between objects. Objects of interest from objects of interest component 102 are projected on the web graph by web projection component 106 to produce one or more context sensitive sub graphs. The web graph can contain a superset or partially overlapping set of objects and edges to the set of objects of interest. A context sensitive projection sub graph has nodes representing objects containing objects of interest that were found in the web graph and edges representing links between these nodes in the web graph. Due to the potentially dynamic nature of the data store, object of interest may not be in the web graph. As such, a web graph that may have been produced prior or subsequent to the set of objects of interest may not contain objects of interest created after or before the web graph was produced. Additionally, an object of interest can be related to an object represented by a node in the web graph, for example, by a parent, child, or sibling relationship; or an object of interest can be the object represented by a node in the web graph.

A context sensitive projection sub graph based upon a directed web graph $G(N,E)$ with node set N and directed edge set E and a set of objects of interest S can be defined as follows: Objects of interest S are projected on graph G to obtain a set of projection nodes $N_p$, where $N_p = S \cap N$. Note that ideally, $N_p = S$, but in some cases objects of interest S will not be found in the graph G. Thus, in general, $N_p \subseteq S$. The context sensitive projection graph is a sub graph $\overline{G_p}(N_p, E_p)$ of G induced on $N_p$ nodes, edge sets $E_p=\{(u,v)\in E; u \in \wedge v \in N_p\}$, where u and v are a pair of nodes.

Given typical distances between objects of interest, context sensitive projection sub graph produced by web projection component 106 can include disconnected or isolated nodes that do not have any edges to other connected nodes in the sub graph. A connected node has at least one edge connecting it directly to another node in the sub graph. Disconnected nodes can be connected by web projection component 106 to other nodes of context sensitive projection sub graph by identifying one or more nodes from the web graph that form a path between a disconnected node and a connected node of context sensitive projection sub graph. In one aspect, nodes that form a shortest path between a disconnected node and a connected node of context sensitive projection sub graph are employed to produce context sensitive connection sub graph. The shortest path can be determined by, but is not limited to, the number of nodes along the path. A connection node is added to the context sensitive connection sub graph for each node from the web graph that was used to connect a disconnected node to a connected node. A set of connected nodes has connections amongst themselves, but does not have a connection to disconnected nodes or to other sets of connected nodes. In a set of connected nodes, there is at least one path between every pair of nodes. Sets of connected nodes can also be connected by identifying one or more nodes from the web graph that form a path between one set of connected nodes to another set of connected nodes of the context sensitive projection sub graph. When all disconnected nodes and sets of connected nodes have been connected by at least one edge, the resulting sub graph is a context sensitive connection sub graph.

A context sensitive connection sub graph based upon a directed web graph G(N,E) with node set N and directed edge set E and a set of objects of interest S can be defined as follows: Objects of interest S are projected on graph G to obtain a set of projection nodes $N_p$, where $N_p = S \cap N$. Note that ideally, $N_p=S$, but in some cases objects of interest S will not be found in the graph G. Thus, in general, $N_p \subset S$. Context sensitive connection graph is a subgraph $G_c(N_c, E_c)$ of G induced on $N_c$ nodes, where $N_c = N_p \cup C$, edge sets $E_c=\{(u,v) \in E; u \in N_c \wedge v \in N_c\}$, where u and v are a pair of nodes. Set C is a set of connection nodes, the minimal set of nodes that makes graph $G_p$ have all nodes connected.

In one aspect, finding the minimal number of connection nodes C is NP-hard, since the problem reduces to finding a Steiner tree. An example of a heuristic policy to find the set of C connection nodes to connect all nodes of $G_p$ follows. Let $D_i$ denote the sets of nodes of $G_p$ ordered by decreasing size ($|D_i| \geq |D_i+1|$), where size is determined by the number of nodes in the set. Nodes are grouped together in sets based upon their connections to other nodes. If a set contains more than one node, there is at least one path between every pair of nodes. For example, $D_1$, may contain five nodes that are connected amongst themselves but not connected to any nodes from $D_2$ through $D_i$; $D_2$ may contain three connected nodes that are connected amongst themselves, but not connected to any nodes from $D_1$, and $D_3$ through $D_i$; and $D_3$ through $D_i$ may all be single nodes. An example method for constructing $G_c$ is the following: Connect each connected node set $D_i$ via the shortest path to the largest connected node set until all nodes are connected. For example, start by connecting $D_2$ via a shortest path on nodes $C_2$ to $D_1$. This creates a new largest node $D_{12}=D_1 \cup C_2 \cup D_2$. Connect $D_3$ to $D_{12}$ via shortest path $C_3$ creating $D_{123}=D_{12} \cup C_3 \cup D_3$. Repeat this for the remaining node sets $D_i$ until all nodes are connected. A set of connection nodes is then $C=\cup C_i$. A shortest path between the sets of nodes U and V, in one aspect, can be defined as the shortest undirected path over all pairs of nodes (u,v), $u \in U$, $v \in V$.

TABLE 1

Example features representing the context, context sensitive projection graph and context sensitive connection graph

| F-Context: context features | |
|---|---|
| ContextFeature1 | delineation criteria |
| ContextFeature2 | number of criteria |
| ContextFeature2 | number of objects of interest |
| GF-PROJ: context sensitive projection sub graph ($G_p$) features | |
| $G_p$Nodes | number of nodes in $G_p$ |
| $G_p$Edges | number of edges in $G_p$ |
| $G_p$Components | number of connected components |
| $G_p$GccNodes | nodes in largest component |
| $G_p$GccEdges | edges in largest component |
| $G_p$MxDeg | maximal node degree |
| $G_p$Deg0Nodes | number of isolated nodes |
| $G_p$Deg1Nodes | number of degree 1 nodes |
| $G_p$Triads | number of triangles in $G_p$ |
| $G_p$Density | density of $G_p$ ($|E_p|/(|N_p|(|N_p|-1))$) |
| $G_p$GccSize | size of largest component ($|D_1|/|N_p|$) |
| $G_p$Clustering | clustering coefficient of $G_p$ |
| GF-CONN: context sensitive connection sub graph ($G_c$) features | |
| $G_c$Nodes | number of nodes in $G_c$ |
| $G_c$Edges | number of edges in $G_c$ |
| $G_c$CNodes | number of connector nodes C |
| $G_c$CEdges | number of edges incident to C |
| $G_c$MxCnDeg | maximal connector node C degree |
| $G_c$MxCnOutDeg | maximal connector node C out-degree |
| $G_c$MxPnDeg | maximal projection node ($N_p$) degree in $G_c$ |
| $G_c$AvgPnPath | average path length on $N_p$ nodes in $G_c$ |
| $G_c$MxPnPath | maximum path length on $N_p$ nodes in $G_c$ |
| $G_c$AvgPath | average path length on $N_c$ nodes in $G_c$ |
| $G_c$MxPath | maximum path length on $N_c$ nodes in $G_c$ |
| $G_c$Triads | number of triangles in $G_c$ |
| $G_c$Density | density of $G_c$ ($|E_c|/(|N_c|(|N_c|-1))$) |
| $G_c$GccSize | size of largest component ($|D_1|/|N_p|$) |
| $G_c$Clustering | clustering coefficient of $G_c$ |
| GF-COMB: Combined features | |
| Coverage | coverage of the projection ($N_p$/S) |
| $G_pG_c$Nodes | node ratio ($|N_p|/|N_c|$) |
| $G_pG_c$Edges | edge ratio ($|E_p|/|E_c|$) |
| $G_pG_c$AvgPath | path ratio ($G_c$AvgPnPath/$G_c$AvgPath) |
| $G_pG_c$MxPath | path ratio ($G_c$MxPnPath/$G_c$MxPath) |

Graphical properties describing context sensitive projection sub graph and/or context sensitive connection sub graph are generated by web projection component 106. Table 1 above provides some examples of possible graphical properties extracted from a context sensitive projection sub graph and context sensitive connection sub graph along with some features from the context. Features are grouped into four groups: Context features, F-Context, represent non-graphical properties of the context and/or objects of interest; Context sensitive projection sub graph features, GF-PROJ, representing various aspects of the nodes and connectivity of the sub graph; Context sensitive connection sub graph features, GF-CONN, representing various aspects of nodes and connectivity of the sub graph, along with their relation to nodes of the context sensitive projection sub graph and connection nodes; and combination features, GF-COMB, representing combined features from the context, context sensitive projection sub graph, and context sensitive connection sub graph. These features are used to characterize the set of objects of interest as a whole. Additional features can be employed to characterize the relationship of an individual node to the full set of nodes. Furthermore, features are not limited to those identified above. Any appropriate feature extracted from the context or sub-graphs or derivation therefrom can be employed to characterize all or any portion of the set of objects of interest.

Web projection component 106, in an aspect, employs an artificial intelligence model to make an inference 108 related to the context and/or set of objects of interest. An artificial intelligence model can include, but is not limited to, expert systems, case based reasoning, behavior based artificial intelligence, evolutionary computation, classifiers, a statistical model, a probabilistic model, a neural network, a decision tree, a hidden Markov model, a support vector machine, fuzzy logic, a Bayesian classifier, or any combination thereof. Web projection component 106 makes an inference 108 related to the context and/or set of objects of interest based upon the graphical properties of the one or more sub graphs and the artificial intelligence model. The inference 108 can relate, but is not limited, to predictions related to content, relationships, quality, relevance, and user behavior with respect to the context and/or all or a portion of the set of objects of interest. In another aspect, the inference 108 can relate, but is not limited to, pattern recognition with respect to graphical properties of a sub graph, such as clusters, loops, anomalies, linkage patterns, edge density, path length between nodes, and patterns matching or approximating stored reference patterns.

Figure 2:
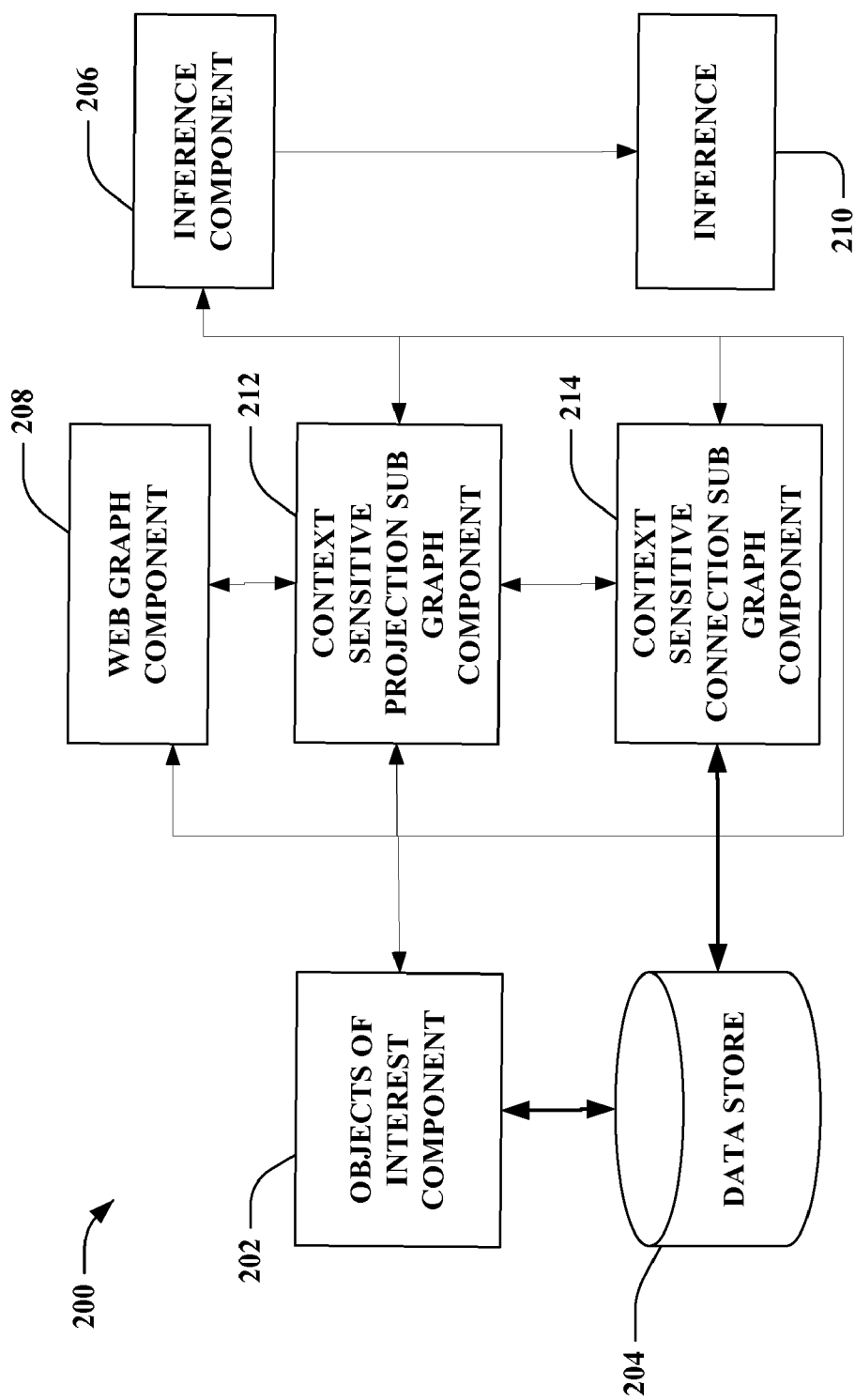
FIG. 2 provides a more detailed block diagram of a system for employing a web projection based inference model in accordance with one aspect of the claimed subject matter.

FIG. 2 illustrates a general block diagram of a system 200 based upon web projections employing one or more artificial intelligence models to make an inference related to a set of objects within a context. System 200 employs graphical properties of sub graphs projected on web graphs as input to the artificial intelligence models. System 200 includes objects of interest component 202 that generates or identifies a set of objects of interest from data store 204. Objects can include any of, but are not limited to, domains, web pages or URLs, images, videos, audio, documents, data structures and the like. A context can employ any criteria to delineate objects of interest from a larger set of objects. Some example contexts delineating objects of interest are results from a user or system query, objects a user has previously viewed, pages on a website, newly added objects, objects above or below an occurrence threshold, objects that have recently changed, objects linked to a particular object, and objects downloaded within a period of time. The context can be defined by one or more users or systems, or can be inferred by the objects of interest component. The objects of interest component can employ artificial intelligence models to infer the context based upon, but not limited to, user or system defined profiles, observation of user or system activity, logged data, and data exchanged with local or remote systems.

Web graph component 208 constructs a web graph from all or part of the data in data store 204. The web graph has nodes representing objects and edges representing links between objects. Objects of interest from objects of interest component 202 are projected on the web graph by context sensitive projection sub graph component 212 to produce one or more context sensitive projection sub graphs. The web graph can contain a superset or partially overlapping set of objects and edges to the set of objects of interest. A context sensitive projection sub graph has nodes representing objects containing objects of interest that were found in the web graph and edges representing links between these nodes from the web graph. Due to the potentially dynamic nature of the data store, object of interest may not be in the web graph. As such, a web graph that may have been produced prior or subsequent to the set of objects of interest may not contain objects of interest created after or before the web graph was produced. Additionally, an object of interest can be related to an object represented by a node in the web graph, for example, by a parent, child, or sibling relationship; or an object of interest can be the object represented by a node in the web graph.

Given the typical distance between search result objects, context sensitive projection sub graph produced by context sensitive projection sub graph component 212 can include disconnected or isolated nodes that do not have any edges to other connected nodes in the sub graph. A connected node has at least one edge connecting it directly to another node in the sub graph. Disconnected nodes can be connected by context sensitive connection sub graph component 214 to other nodes of context sensitive projection sub graph by identifying one or more nodes from the web graph that form a path between a disconnected node and a connected node of context sensitive projection sub graph. In one aspect, nodes and edges from the web graph that form a shortest path between a disconnected node and a connected node of context sensitive projection sub graph are employed to produce a context sensitive connection sub graph. The shortest path can be determined by, but is not limited to, the number of nodes along the path. A connection node and edges are added to the sub graph for each node along the path from the web graph that was used to connect a disconnected node to a connected node. A set of connected nodes has connections amongst themselves, but does not have a connection to disconnected nodes or to other sets of connected nodes. In a set of connected nodes, there is at least one path between every pair of nodes. Sets of connected nodes can also be connected by identifying one or more nodes from the web graph that form a path between one set of connected nodes to another set of connected nodes of context sensitive projection sub graph. A connection node and edges are added to the sub graph for each node along the path from the web graph that was used to connect a set of connected nodes to another set of connected nodes. When all disconnected nodes and sets of connected nodes have been connected by at least one edge, the resulting sub graph is a context sensitive connection sub graph.

Graphical properties describing context sensitive projection sub graph and/or context sensitive connection sub graph are generated by inference component 206. Inference component 206, in an aspect, employs an artificial intelligence model to make an inference 210 related to the set of objects of interest. An artificial intelligence model can include, but is not limited to, expert systems, case based reasoning, behavior based artificial intelligence, evolutionary computation, classifiers, a statistical model, a probabilistic model, a neural network, a decision tree, a hidden Markov model, a support vector machine, fuzzy logic, a Bayesian classifier, or any combination thereof. Inference component 206 makes an inference 210 related to the context and/or set of objects of interest based upon the graphical properties of the one or more sub graphs and the artificial intelligence model. The inference 210 can relate, but is not limited, to predictions related to content, relationships, quality, relevance, and user behavior with respect to the context and/or all or a portion of the set of objects of interest. In another aspect, the inference 210 can relate, but is not limited to, pattern recognition with respect to graphical properties of a sub graph, such as clusters, loops, anomalies, linkage patterns, edge density, path length between nodes, and patterns matching or approximating stored reference patterns.

Figure 3:
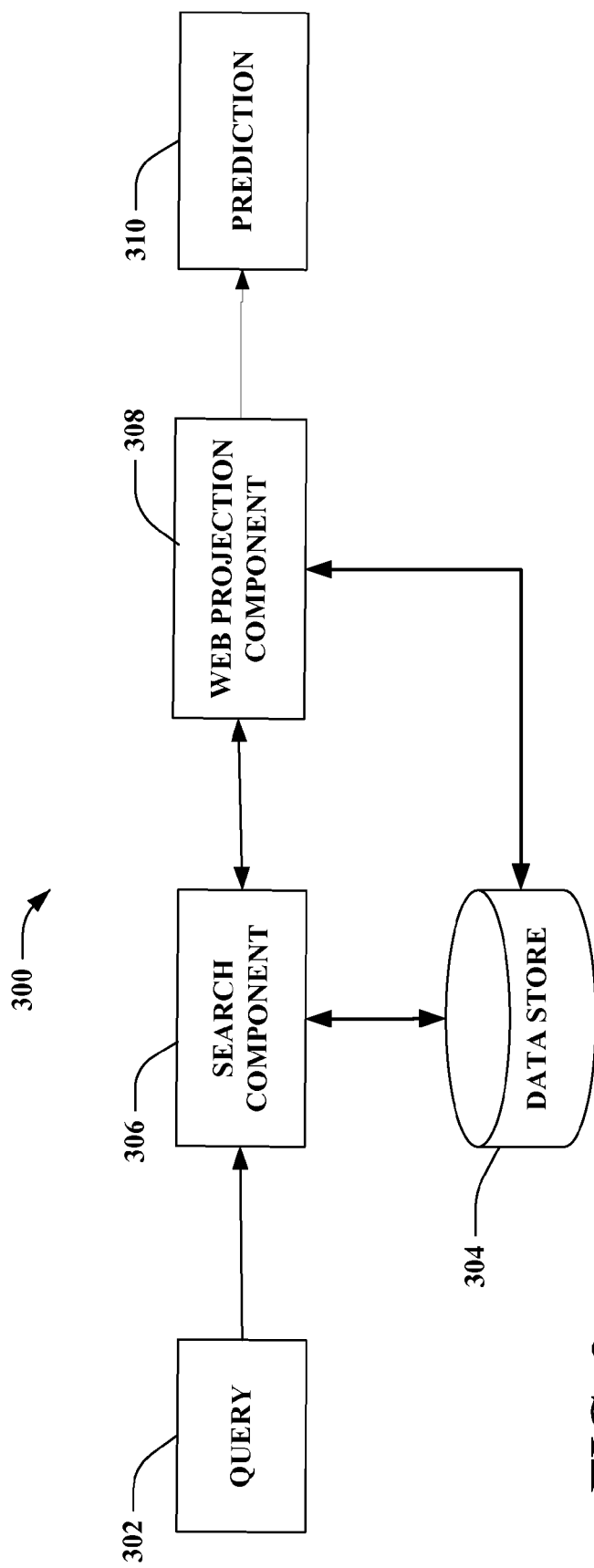
FIG. 3 illustrates a high-level block diagram of a query system for employing a web projection based predictive model in accordance with one aspect of the claimed subject matter.

Referring now to FIG. 3, there is illustrated a general block diagram system 300 employing one or more predictive models of search result quality and user query reformulation based upon web projection. System 300 employs graphical properties of sub graphs projected on web graphs as input to the predictive models. System 300 includes search component 306 that can receive queries 302 from a user or system and generate sets of search results from data store 304, such as the Internet. Search results can include any object such as domains, web pages or URLs, images, videos, audio, documents, data structures and the like.

Web projection component 308 constructs a web graph from all or part of the data in data store 304. The web graph has nodes representing objects and edges representing links between objects, such as a hyperlink between two web pages. Search result objects, which are the objects of interest, from search component 306 are projected on the web graph by web projection component 308 to produce a context sensitive projection sub graph. The web graph can contain a superset or partially overlapping set of objects and edges to the set of search result objects. The context sensitive projection sub graph has nodes representing objects containing search result objects that were found in the web graph and edges representing links between nodes. Due to the potentially dynamic nature of the data store, search results objects may not be in the web graph. For example, the Internet is a dynamic data store with hyperlinks, web pages, and domains being added and deleted frequently. As such, a web graph that may have been produced prior or subsequent to a search may not contain search results from domains and web pages created after or before the web graph was produced. Additionally, a search result object can be related to an object represented by a node in the web graph, for example, by a parent, child, or sibling relationship; or a search result object can be the object represented by a node in the web graph. For example, each node of the web graph representing objects can be a single domain, while each search result object is a single web page. A domain can be comprised of several web pages. In an another example, each node of the web graph representing objects can be a single web page, while each search result object is also a single web page.

Given typical distances between search result objects, context sensitive projection sub graph produced by web projection component 308 can include disconnected or isolated nodes that do not have any edges to other connected nodes in the sub graph. A connected node has at least one edge connecting it directly to another node in the sub graph. Disconnected nodes can be connected by web projection component 308 to other nodes of query projection sub graph by identifying one or more nodes from the web graph that form a path between a disconnected node and a connected node of context sensitive projection sub graph. In one aspect, nodes from the web graph that form a shortest path between a disconnected node and a connected node of context sensitive projection sub graph are employed to produce context sensitive connection sub graph. The shortest path can be determined by, but is not limited to, the number of nodes along the path or a summation of length designations assigned to each edge along the path. A connection node is added to the context sensitive connection sub graph for each node from the web graph that was used to connect a disconnected node to a connected node. A set of connected nodes has connections amongst themselves, but does not have a connection to disconnected nodes or to other sets of connected nodes. In a set of connected nodes, there is at least one path between every pair of nodes. Sets of connected nodes can also be connected by identifying one or more nodes from the web graph that form a path between one set of connected nodes to another set of connected nodes of the context sensitive projection sub graph. When all disconnected nodes and sets of connected nodes have been connected by at least one edge, the resulting sub graph is a context sensitive connection sub graph.

TABLE 2

Example features representing the query, context sensitive projection graph and context sensitive connection graph

| F-Query: query features | |
|---|---|
| QueryChLen | number of characters in the query |
| QueryWrdLen | number of query words |
| QuerySrcRes | number of search results |
| QueryNDoms | number of domains in result set |
| QueryNUrl | number of URLs in result set |
| QueryNRated | number of results with human rating |

| GF-PROJ: context sensitive projection sub graph ($G_p$) features | |
|---|---|
| $G_p$Nodes | number of nodes in $G_p$ |
| $G_p$Edges | number of edges in $G_p$ |
| $G_p$Components | number of connected components |
| $G_p$GccNodes | nodes in largest component |
| $G_p$GccEdges | edges in largest component |
| $G_p$MxDeg | maximal node degree |
| $G_p$Deg0Nodes | number of isolated nodes |
| $G_p$Deg1Nodes | number of degree 1 nodes |
| $G_p$Triads | number of triangles in $G_p$ |
| $G_p$Density | density of $G_p (|E_p|/(|N_p|(|N_p|-1)))$ |
| $G_p$GccSize | size of largest component $(|D_1|/|N_p|)$ |
| $G_p$Clustering | clustering coefficient of $G_p$ |

| GF-CONN: context sensitive connection sub graph ($G_c$) features | |
|---|---|
| $G_c$Nodes | number of nodes in $G_c$ |
| $G_c$Edges | number of edges in $G_c$ |
| $G_c$CNodes | number of connector nodes C |
| $G_c$CEdges | number of edges incident to C |
| $G_c$MxCnDeg | maximal connector node C degree |
| $G_c$MxCnOutDeg | maximal connector node C out-degree |
| $G_c$MxPnDeg | maximal projection node ($N_p$) degree in $G_c$ |
| $G_c$AvgPnPath | average path length on $N_p$ nodes in $G_c$ |
| $G_c$MxPnPath | maximum path length on $N_p$ nodes in $G_c$ |
| $G_c$AvgPath | average path length on $N_c$ nodes in $G_c$ |
| $G_c$MxPath | maximum path length on $N_c$ nodes in $G_c$ |
| $G_c$Triads | number of triangles in $G_c$ |
| $G_c$Density | density of $G_c (|E_c|/(|N_c|(|N_c|-1)))$ |
| $G_c$GccSize | size of largest component $(|D_1|/|N_p|)$ |
| $G_c$Clustering | clustering coefficient of $G_c$ |

| GF-COMB: Combined features | |
|---|---|
| DomsToUrls | ratio of domains to urls in result set |
| Coverage | coverage of the projection ($N_p/S$) |
| $G_pG_c$Nodes | node ratio $(|N_p|/|N_c|)$ |
| $G_pG_c$Edges | edge ratio $(|E_p|/|E_c|)$ |
| $G_pG_c$AvgPath | path ratio $(G_c$AvgPnPath$/G_c$AvgPath$)$ |
| $G_pG_c$MxPath | path ratio $(G_c$MxPnPath$/G_p$MxPath$)$ |

Graphical properties describing context sensitive projection sub graph and/or context sensitive connection sub graph are generated by web projection component 308. Table 2 above provides some examples of possible graphical properties extracted from a context sensitive projection sub graph and context sensitive connection sub graph along with some features from the query. Features are grouped into four groups: Query features, F-Query, represent non-graphical properties of the results set; Context sensitive projection sub graph features, GF-PROJ, representing various aspects of the nodes and connectivity of the sub graph; Context sensitive connection sub graph features, GF-CONN, representing various aspects of nodes and connectivity of the sub graph, along with their relation to nodes of the context sensitive projection sub graph and connection nodes; and combination features, GF-COMB, representing combined features from the query, context sensitive projection sub graph, and context sensitive connection sub graph. These features are used to characterize the results set as a whole. Additional features can be employed to characterize the relationship of an individual node to the full set of nodes. Furthermore, features are not limited to those identified above. Any appropriate feature extracted from the query or sub-graphs or derivation therefrom can be employed to characterize all or any portion of the set of query results.

Web projection component 308, in an aspect, employs a predictive model that has been trained based upon at least one of features of previous queries, graphical properties of sub graphs of previous query results, human or system judgments of previous query results, or observation of previous human or system query reformulations, or any combination thereof. A predictive model can include, but is not limited to, expert systems, case based reasoning, behavior based artificial intelligence, evolutionary computation, classifiers, a statistical model, a probabilistic model, a neural network, a decision tree, a hidden Markov model, a support vector machine, fuzzy logic, a Bayesian classifier, or any combination thereof. Web projection component 308 produces a prediction 310 related to the query or query results based upon the graphical properties of the sub graph and the predictive model. The prediction 310 can relate, but is not limited, to the quality of the query results or query reformulations. The quality of the query results can be indicated by any appropriate ranking system, such as numerical, alpha, or alpha-numeric, rank ordered, ranges, classification, or by any other quantitative or qualitative measure. In an aspect, the quality of query results can also relate to predicting a quality value that a human would assign to one or more query results that do not currently have a quality value assigned by a human. In an aspect, this prediction 310 can be based upon a human quality value assignment to one or more of the other query results. In another aspect, quality can relate to classifying results, such as for spam or age appropriateness. For example, individuals results can be identified as spam or an overall assessment of the quantity of spam in a set of results can be provided. Linkage patterns between nodes can be indicative of spam or age appropriateness. Quality of query results can be based on each individual resulting object, a part of the result set, or on the entire result set. For example, a score can be associated with each resulting object. In another example, results can be grouped into quality classifications, such as top 20%, second 20%, third 20%, fourth 20%, and bottom 20%. Another example would be quality of the overall result set, such as a good result set or a bad result set. Query reformulation can relate, but is not limited, to whether a query reformulation will be more specialized or generalized, whether a related or completely different query is needed, if a query reformulation is needed, or predicting one or more query reformulations. Specialized meaning a narrowing of the query and generalized meaning a broadening of the query. The prediction 310 can, but is not limited, to being stored, being presented to the user via a human sensory receptor, such as visually, aurally, or physically by an appropriate device, or being employed by an application locally or remotely.

Figure 4:
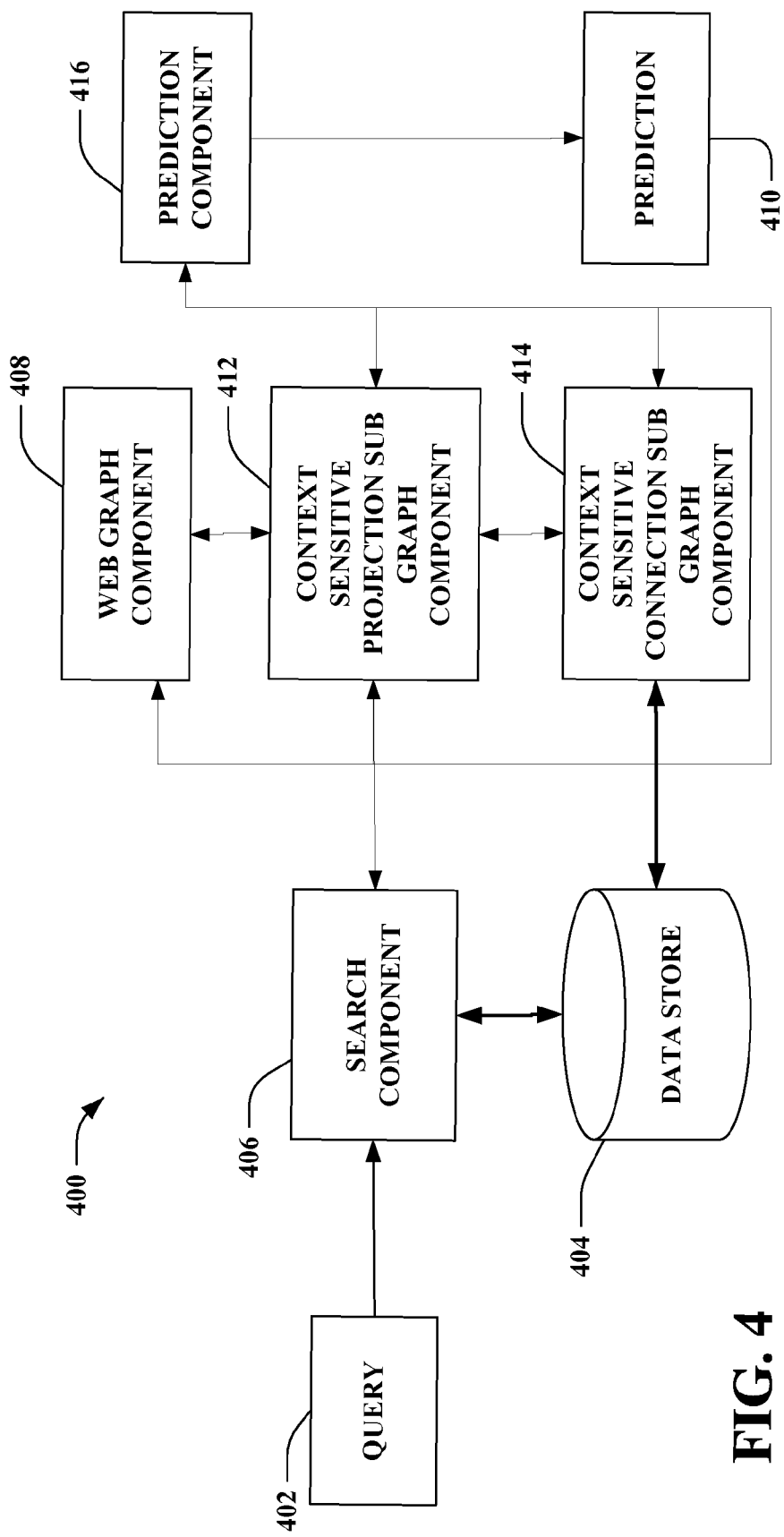
FIG. 4 provides a more detailed block diagram of a query system for employing a web projection based predictive model in accordance with one aspect of the claimed subject matter.

FIG. 4 illustrates a general block diagram of a system 400 employing a predictive model of search result quality and user query reformulation based upon web projection. System 400 employs graphical properties of sub graphs projected on web graphs as input to predictive models. System 400 includes search component 406 that can receive query 402 from a user or system and generate a set of search results from data store 404, such as a help system.

Web graph component 408 constructs a web graph from all or part of the data in data store 404. Web graph has nodes representing objects and edges representing links between objects, such as a hyperlink between two help pages. Search result objects from search component 406 are projected on the web graph by context sensitive projection sub graph component 412 to produce a context sensitive projection sub graph. Context sensitive projection sub graph has nodes representing objects containing search result objects that were found in the web graph and edges representing links between nodes containing search result objects that were found in the web graph. Additionally, a search result object can be related to an object represented by a node in the web graph, for example, by a parent, child, or sibling relationship; or a search result object can be the object represented by a node in the web graph. For example, each node of the web graph representing objects can be a chapter in the help system, while each search result object is a specific help topic. Each chapter can be comprised of several help topics. In an another example, each node of the web graph representing objects can be a single help topic, while each search result object is also a single help topic.

Given the typical distance between search result objects, context sensitive projection sub graph produced by context sensitive projection sub graph component 412 can include disconnected or isolated nodes that do not have any edges to other connected nodes in the sub graph. A connected node has at least one edge connecting it directly to another node in the sub graph. Disconnected nodes can be connected by context sensitive connection sub graph component 414 to other nodes of context sensitive projection sub graph by identifying one or more nodes from the web graph that form a path between a disconnected node and a connected node of context sensitive projection sub graph. In one aspect, nodes and edges that form a shortest path between a disconnected node and a connected node of context sensitive projection sub graph are employed to produce a context sensitive connection sub graph. The shortest path can be determined by, but is not limited to, the number of nodes along the path. A connection node and edges are added to the sub graph for each node along the path from the web graph that was used to connect a disconnected node to a connected node. A set of connected nodes has connections amongst themselves, but does not have a connection to disconnected nodes or to other sets of connected nodes. In a set of connected nodes, there is at least one path between every pair of nodes. Sets of connected nodes can also be connected by identifying one or more nodes from the web graph that form a path between one set of connected nodes to another set of connected nodes of context sensitive projection sub graph. A connection node and edges are added to the sub graph for each node along the path from the web graph that was used to connect a set of connected nodes to another set of connected nodes. When all disconnected nodes and sets of connected nodes have been connected by at least one edge, the resulting sub graph is a context sensitive connection sub graph.

Graphical properties describing the query projection sub graph and/or query connection sub graph are generated by prediction component 416. Prediction component 416 in an aspect employs a predictive model that has been trained based upon at least one of features of previous queries, graphical properties of sub graphs of previous query results, human or system judgments of previous query results, or observation of previous human or system query reformulations, or any combination thereof. The predictive model can include, but is not limited to, expert systems, case based reasoning, behavior based artificial intelligence, evolutionary computation, classifiers, a statistical model, a probabilistic model, a neural network, a decision tree, a hidden Markov model, a support vector machine, fuzzy logic, a Bayesian classifier, or any combination thereof. Prediction component 416 generates a prediction 410 related to the query or query results based upon graphical properties of the sub graph and the predictive model. The prediction 410 can relate, but is not limited, to the quality of the query results and query reformulations. The quality of the query results can be indicated by any appropriate ranking system, such as numerical, alpha, or alpha-numeric, rank ordered, ranges, classification, or any other quantitative or qualitative measure. Query reformulation can relate, but is not limited, to whether a query reformulation will be more specialized or generalized, whether a related or completely different query is needed, if a query reformulation is needed, or predicting one or more query reformulations. Specialized meaning a narrowing of the query and generalized meaning a broadening of the query.

Figure 5:
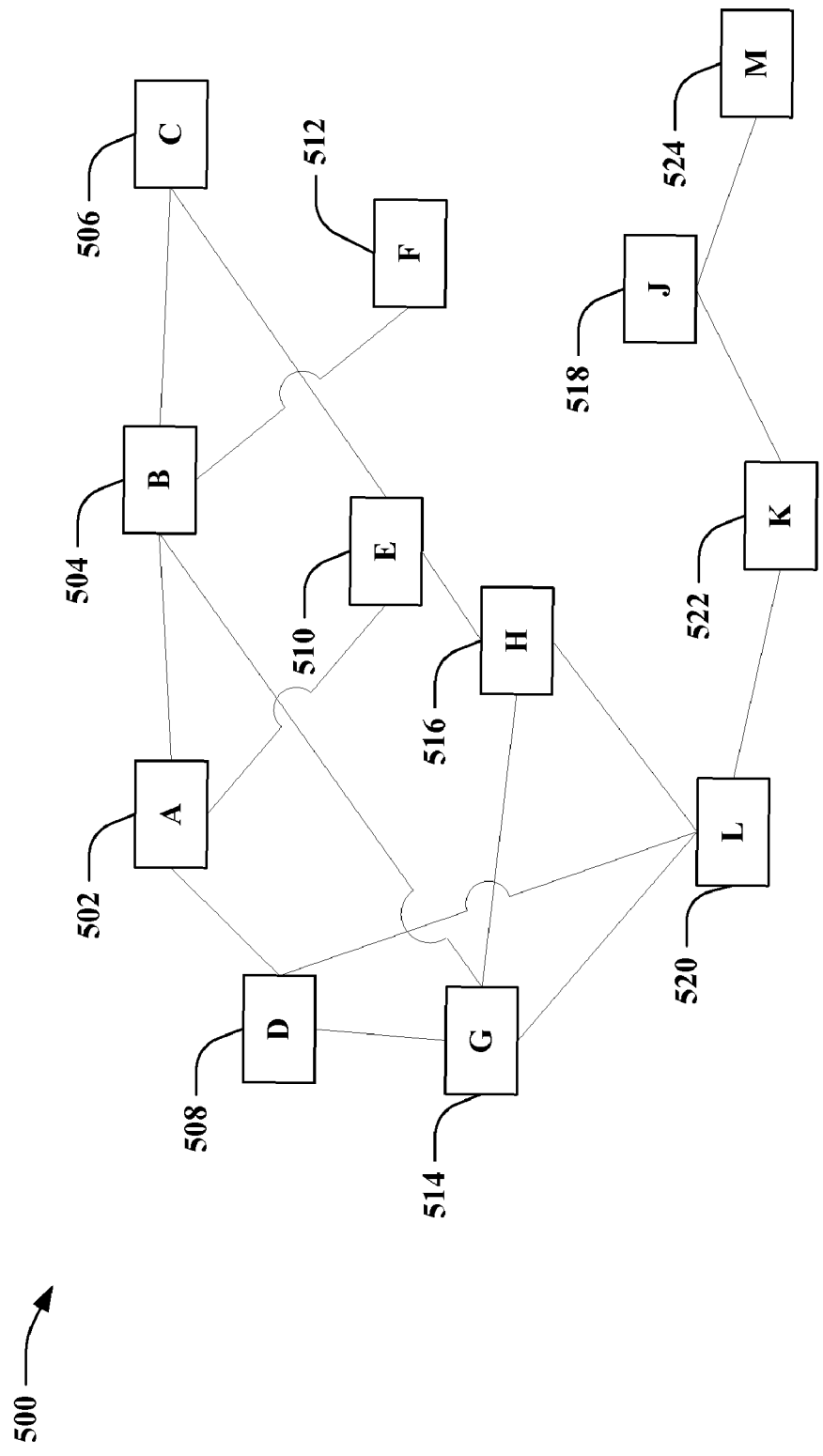
FIG. 5 provides an illustration of a web graph.

Referring now to FIG. 5, web graph 500 is presented. Nodes A 502, B 504, C 506, D 508, E 510, F 512, G 514, H 516, J 518, K 522, L 520, and M 524 represent objects, A, B, C, D, E, F, G, H, J, K, L, M respectively in a data store, such as web pages from the internet A line connecting two nodes represents a unidirectional or bidirectional link between the nodes, such as a hyperlink from one web page to another web page. A node can be connected to one other node, a plurality of other nodes, or no other nodes. For example, Node A 502 is connected to nodes B 504, D 508, and E 510, while node M 524 is only connected to node J 518.

Figure 6:
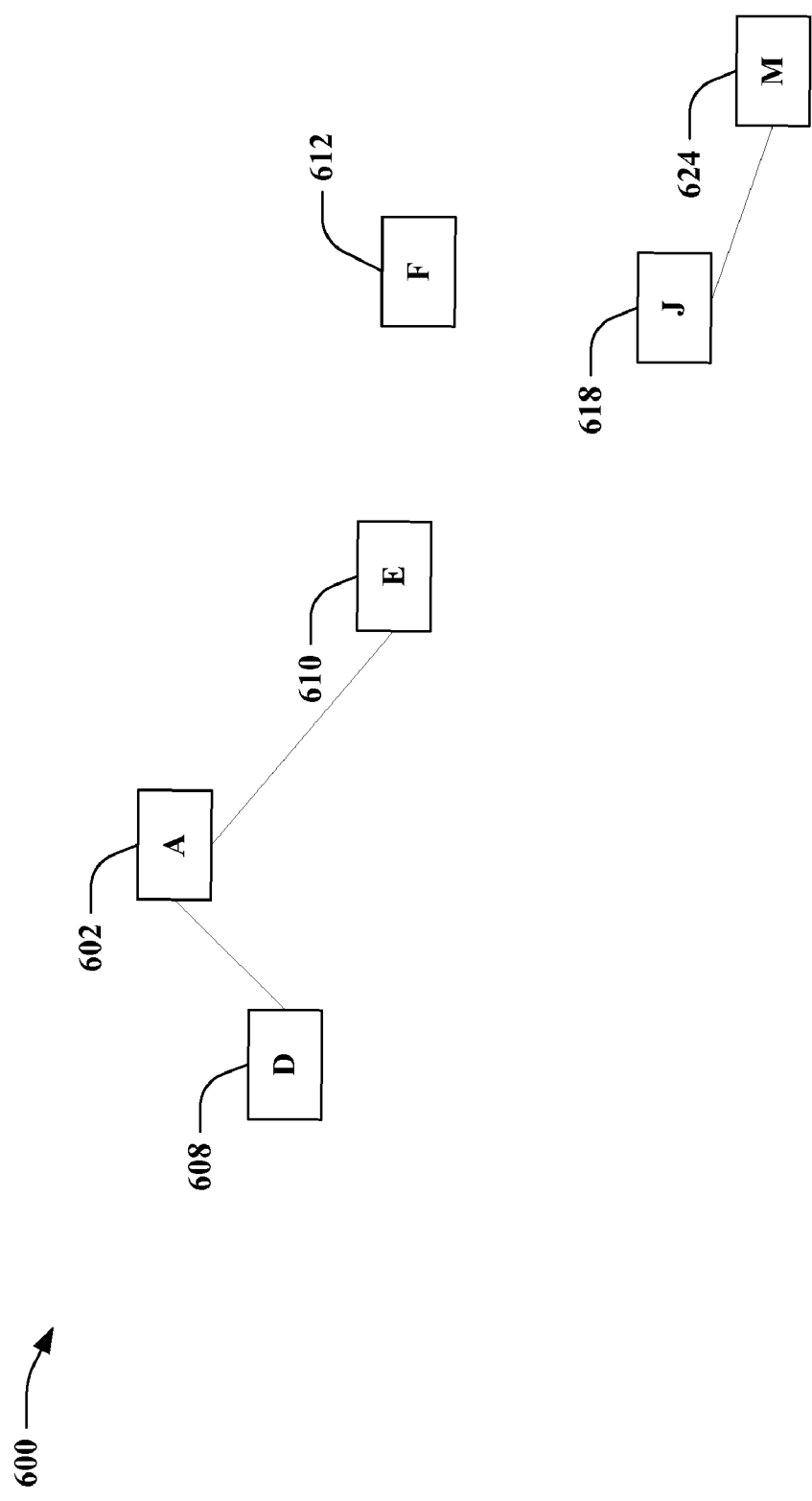
FIG. 6 provides an illustration of a query projection sub graph.

Turning to FIG. 6, context sensitive projection sub graph is presented for search results containing objects: A, D, E, F, J, and M projected on web graph 600. Nodes A 602, D 608, E 610, F 612, J 618, and M 624 represent objects A, D, E, F, J, and M respectively found on web graph 500. The context sensitive projection sub graph contains connected nodes A 602, D 608, E 610, J 618, and M 624 that each have at least one edge directly connecting the node to another node. Nodes A 602, D 608, E 610 make up a connected node set since the three nodes are connected amongst themselves but do not have a connection to node F 612 or to the connected node set made up of nodes J 618 and M 624. Node F 612 is a disconnected node that does not have any edges connecting the node to another node.

Figure 7:
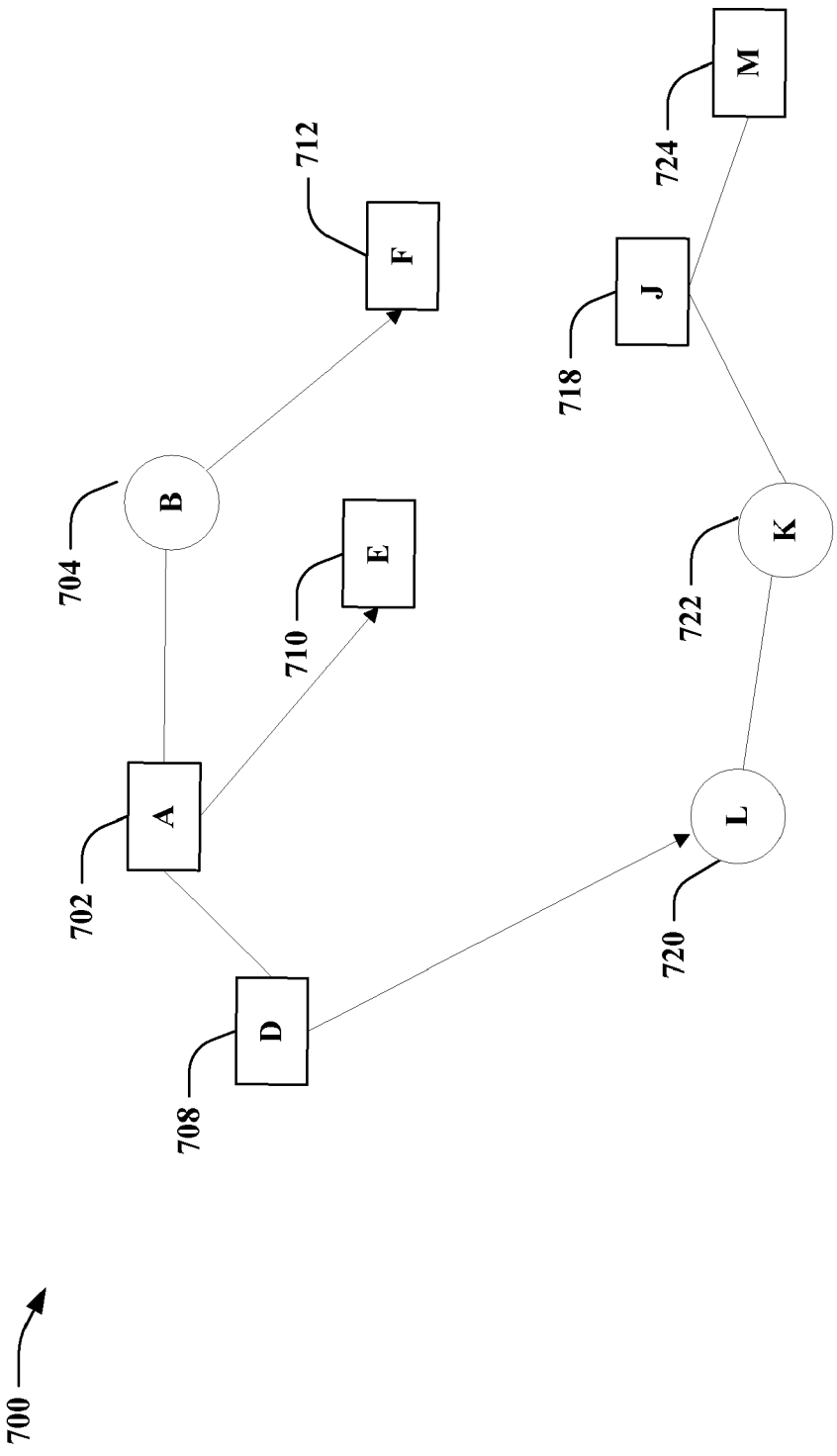
FIG. 7 provides an illustration of a query connection sub graph.

Now referring to FIG. 7, a context sensitive connection graph 700 is presented based upon web graph 500 and context sensitive projection graph 600. Connected node set {J 718, M 724} is connected to connected node set {A 702, D 708, E 710} via a shortest path from web graph 500 made up of connection node L 720 and K 722. Although, there are several other possible paths from node J 718 to either node D 708 or E 710 using nodes K 522, L 520, G 514 and H 516 from web graph 500, the path from J 718 through K 722 and L 720 to D 708 is the shortest path between the two sets of connected nodes as determined by a number of nodes count. Likewise, disconnected node F 712 is connected to connected node set {A 702, D 708, E 710} via a shortest path from web graph 500 made up of connection node B 704.

In view of the exemplary systems shown and described supra, methodologies that can be implemented in accordance with the disclosed subject matter will be better appreciated with reference to the following flow charts. While for purposes of simplicity of explanation, the methodologies are shown and described as a series of blocks, it is to be understood and appreciated that the claimed subject matter is not limited by the order of the blocks, as some blocks can occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules can be combined and/or distributed as desired in various aspects.

Figure 8:
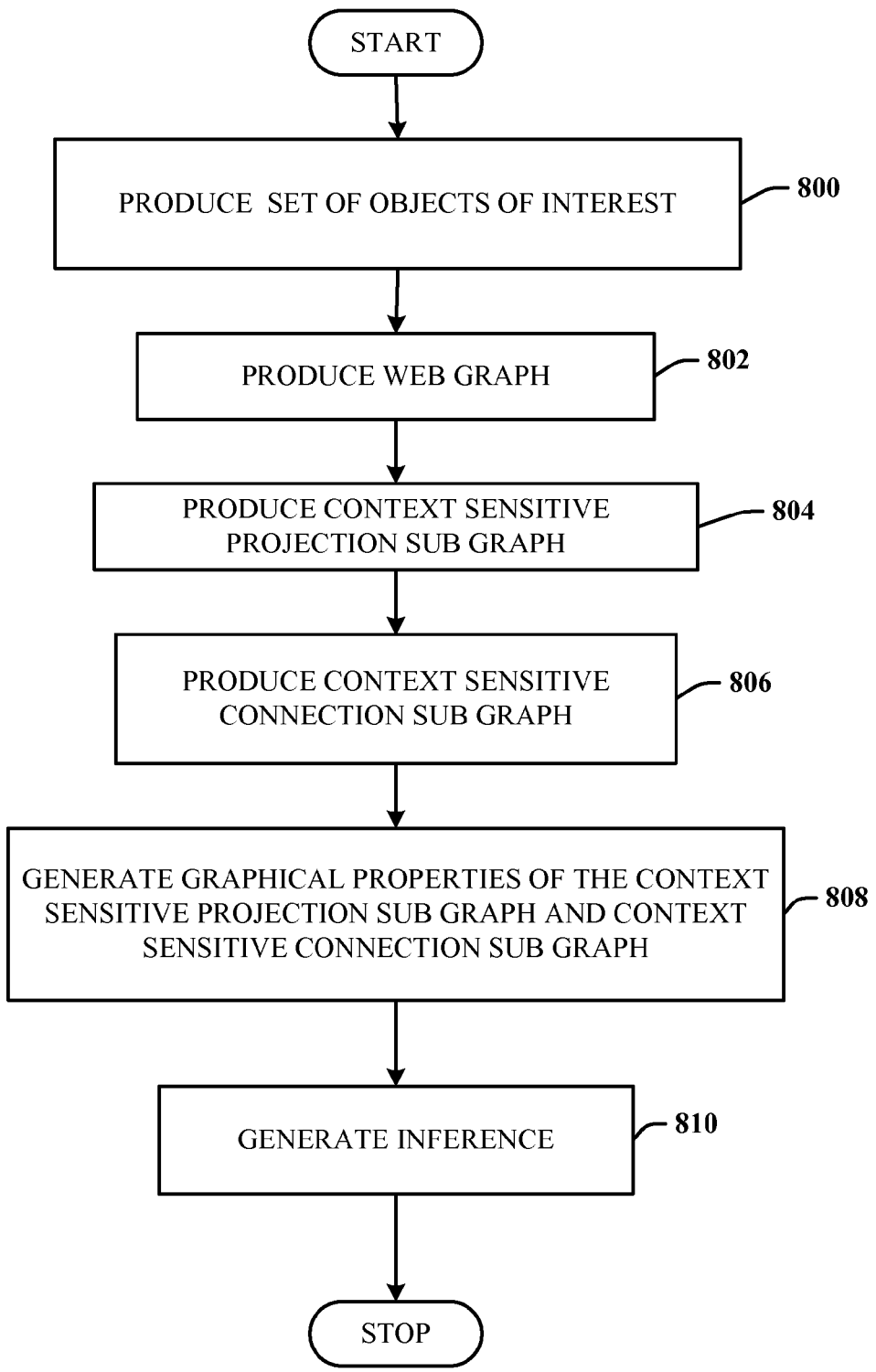
FIG. 8 illustrates a flow diagram of a methodology employing a web projection based inference model in accordance with an aspect of the claimed subject matter.

Referring now to FIG. 8 there is illustrated a flow chart of one methodology for employing one or more artificial intelligence models to make an inference related to a set of objects within a context. The methodology employs graphical properties of sub graphs projected on web graphs as input to the artificial intelligence models. At 800, a set of objects of interest are produced from a data store. Objects can include any of, but are not limited to, domains, web pages or URLs, images, videos, audio, documents, data structures and the like. A context can employ any criteria to delineate objects of interest from a larger set of objects. Some example contexts delineating objects of interest are results from a user or system query, objects a user has previously viewed, pages on a website, newly added objects, objects above or below an occurrence threshold, objects that have recently changed, objects linked to a particular object, and objects downloaded within a period of time. The context can be defined by one or more users or systems, or can be inferred by the objects of interest component. The objects of interest component can employ artificial intelligence models to infer the context based upon, but not limited to, user or system defined profiles, observation of user or system activity, logged data, and data exchanged with local or remote systems.

At 802, a web graph is constructed from all or part of the data in the data store. The web graph has nodes representing objects and edges representing links between objects, such as a hyperlink between two web pages. At 804, objects of interest are projected on the web graph to produce a context sensitive projection sub graph. The context sensitive projection sub graph has nodes representing objects containing objects of interest that were found in the web graph and edges representing an edge between each pair of these nodes where there is an edge directly connecting the pair of nodes in the web graph. Due to the potentially dynamic nature of the data store, objects of interest may not be in the web graph. As such, a web graph that may have been produced prior or subsequent to the set of objects of interest may not contain objects of interest created after or before the web graph was produced. Additionally, an object of interest can be related to an object represented by a node in the web graph, for example, by a child relationship; or an object of interest can be the object represented by a node in the web graph.

Figure 9:
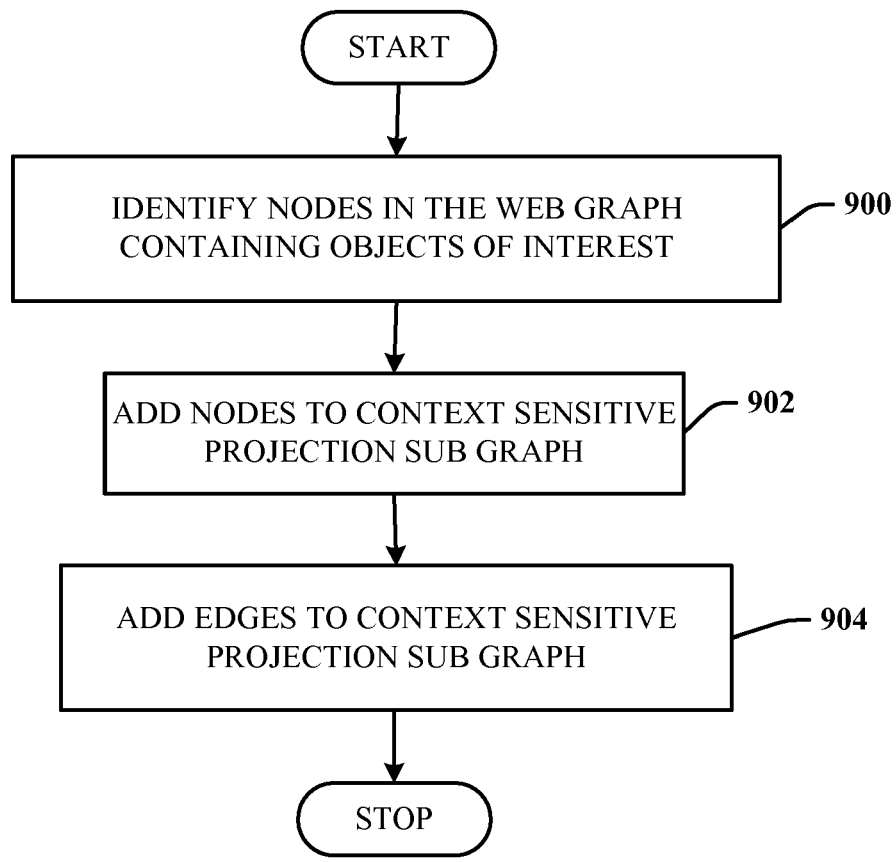
FIG. 9 illustrates a flow diagram of a methodology for projecting objects of interest onto a web graph to produce a context sensitive projection sub graph in accordance with an aspect of the claimed subject matter.

Referring to FIG. 9, in one aspect, a method to produce a context sensitive projection sub graph using a web graph and objects of interest is illustrated. At 900, identify each node containing an object of interest that exists in the web graph. At 902, add a node to a context sensitive projection sub graph for each node containing an object of interest identified in the web graph. At 904, add an edge between each pair of nodes in the query sub-graph where there is an edge between the same pair of nodes in the web graph. The resulting graph is a context sensitive projection sub graph.

Turning back to FIG. 8, given the typical distance between objects of interest, the context sensitive projection sub graph produced can include disconnected nodes that do not have any edges to other connected nodes in the sub graph. A connected node has at least one edge connecting it directly to another connected node in the sub graph. At 806, a context sensitive connection sub graph is produced when sets of connected nodes are connected by identifying one or more nodes from the web graph that form a path between one set of connected nodes to another set of connected nodes of the context sensitive projection sub graph. In one aspect, nodes and edges that form a shortest path between a set of connected nodes and another set of connected nodes of the context sensitive projection sub graph are employed to produce a context sensitive connection sub graph. The shortest path can be determined by, but is not limited to, the number of nodes along the path. A connection node and edges are added to the sub graph for each node along the path from the web graph that was used to connect a set of connected nodes to another set of connected nodes. A set of connected nodes has connections amongst themselves, but does not have a connection to disconnected nodes or to other sets of connected nodes. Disconnected nodes are also connected to other nodes of the context sensitive projection sub graph by identifying one or more nodes from the web graph that form a path between a disconnected node and a connected node of the context sensitive projection sub graph. In one aspect, nodes and edges that form a shortest path between a disconnected node and a connected node of the context sensitive projection sub graph are employed to produce a query connection sub graph. The shortest path can be determined by, but is not limited to, the number of nodes along the path. A connection node and edges are added to the sub graph for each node along the path from the web graph that was used to connect a disconnected node to a connected node. When all disconnected nodes and sets of connected nodes have been connected by at least one edge, the resulting sub graph is a context sensitive connection sub graph.

Figure 10:
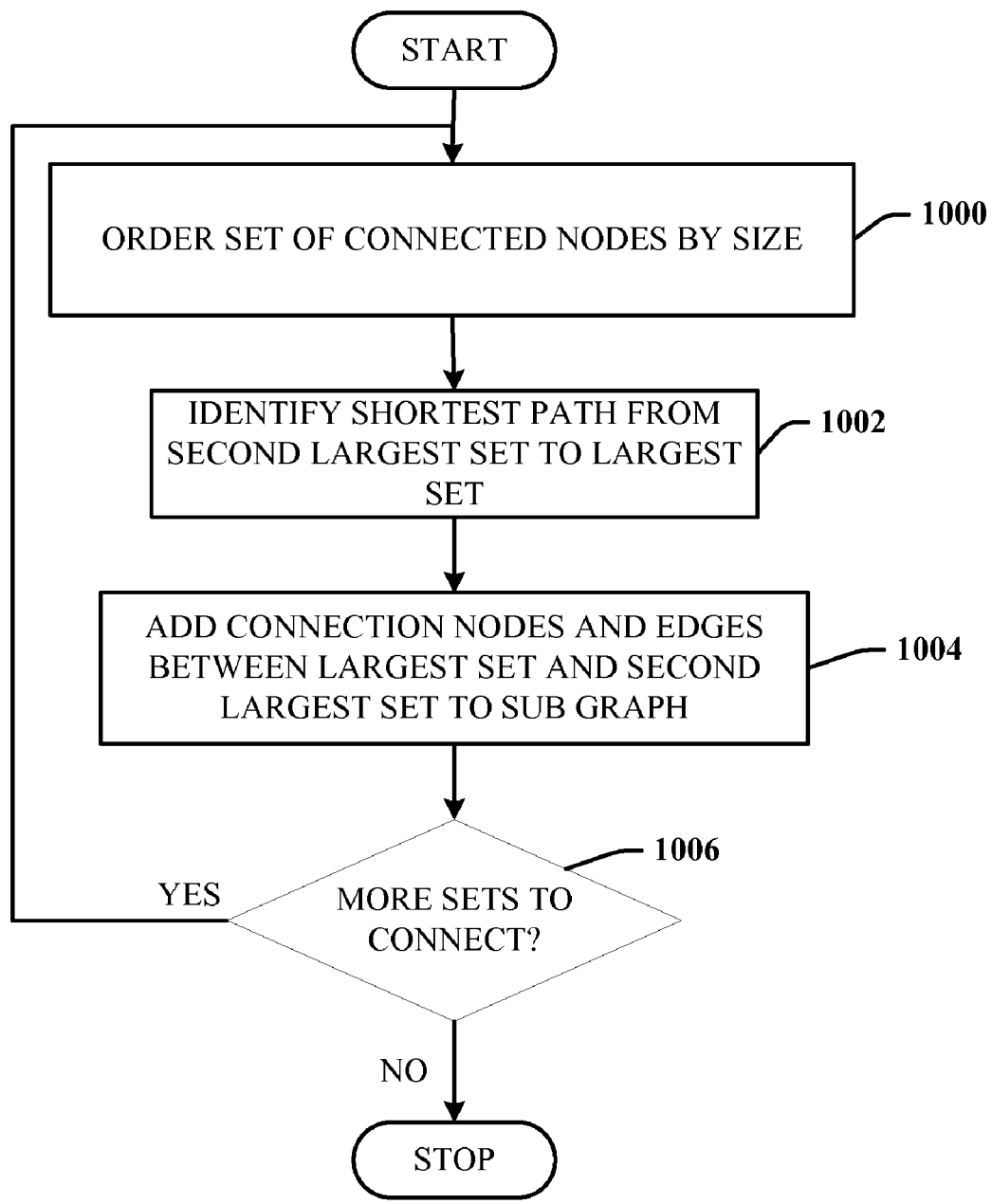
FIG. 10 illustrates a flow diagram of a methodology for employing connection nodes to produce a context sensitive connection sub graph in accordance with an aspect of the claimed subject matter.

Referring to FIG. 10, in one aspect, a method to find the set of connection nodes C connecting nodes of a context sensitive projection sub graph $G_p$ using a web graph to produce a context sensitive connection sub graph is illustrated. At 1000, order $D_i$, the sets of nodes of $G_p$, by decreasing size ($|D_i| \geq |D_i+1|$), where size is determined by the number of nodes in the set. Nodes are grouped together in sets based upon their connections to other nodes. If a set contains more than one node, there is at least one path between every pair of nodes. For example, $D_1$, may contain five nodes that are connected amongst themselves but not connected to any nodes from $D_2$ through $D_i$; $D_2$ may contain three connected nodes that are connected amongst themselves, but not connected to any nodes from $D_1$, and $D_3$ through $D_i$; and $D_3$ through $D_1$ may all be single nodes. At 1002, identify a shortest path from $D_2$ to $D_1$ via nodes $C_2$. At 1004, add nodes $C_2$ and edges along the path from $D_2$ to $D_1$ to a sub graph having all nodes and edges from the query projection sub graph. This creates a new largest node $D_{12}=D_1 \cup C_2 \cup D_2$. At 1006, a check is made regarding if there are any remaining sets in $D_i$ that have not attempted to be connected to the largest set. If there are more sets, then acts performed at 1000, 1002, and 1004 are repeated. If there are no more sets, then decision at 1006 proceeds to the "STOP" block. The resulting graph is a context sensitive connection sub graph. If a node or connected set of nodes in $D_i$ are isolated in the web graph, then the node or connected set of nodes will be isolated in the context sensitive connection sub graph.

Referring back to FIG. 8 at 808, graphical properties describing the query projection sub graph and/or query connection sub graph are generated. Table 1 above provides some examples of possible graphical properties extracted from a context sensitive projection sub graph and context sensitive connection sub graph along with some features from the context. The features are grouped into four groups: Context features, F-Context, represent non-graphical properties of the results set; Context sensitive projection sub graph features, GF-PROJ, representing various aspects of the nodes and connectivity of the sub graph, Context sensitive connection sub graph features, GF-CONN, representing various aspects of nodes and connectivity of the sub graph, along with their relation to nodes of the context sensitive projection sub graph and connection nodes; and combination features, GF-COMB, representing combined features from the context, context sensitive projection sub graph, and context sensitive connection sub graph.

At 810, an inference is generated related to the context and/or all or part of the set of objects of interest based upon the graphical properties of the sub graph. In an aspect, an artificial intelligence model can be employed in making the inference. An artificial intelligence model can include, but is not limited to, expert systems, case based reasoning, behavior based artificial intelligence, evolutionary computation, classifiers, a statistical model, a probabilistic model, a neural network, a decision tree, a hidden Markov model, a support vector machine, fuzzy logic, a Bayesian classifier, or any combination thereof. The inference can relate, but is not limited, to predictions related to content, relationships, quality, relevance, and user behavior with respect to the context and/or all or a portion of the set of objects of interest. In another aspect, the inference can relate, but is not limited to, pattern recognition with respect to graphical properties of a sub graph, such as clusters, loops, anomalies, linkage patterns, edge density, path length between nodes, and patterns matching or approximating stored reference patterns.

Figure 11:
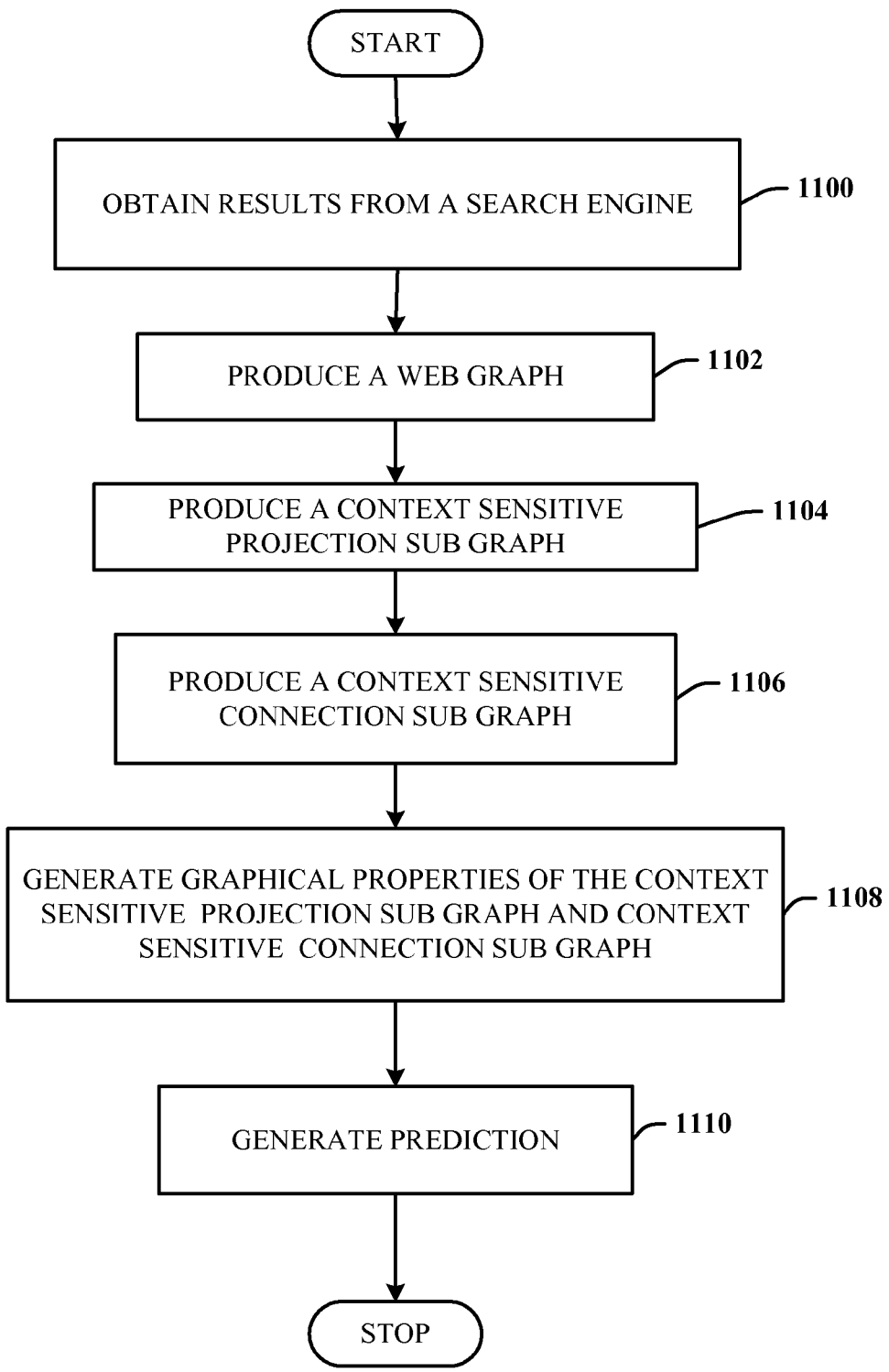
FIG. 11 illustrates a flow diagram of a methodology for employing web projections in relation to a query.

Referring now to FIG. 11 there is illustrated a flow chart of one methodology for employing a predictive model of search result quality and user query reformulation based upon web projection. The methodology employs graphical properties of sub graphs projected on web graphs as input to the predictive models. At 1100, a set of search results are generated from a data store, such as the internet, based upon a query received from a user or system. Search results can include any object such as domains, web pages or URLs, images, videos, audio, documents, data structures and the like.

At 1102, a web graph is constructed from all or part of the data in the data store. The web graph has nodes representing objects and edges representing links between objects, such as a hyperlink between two web pages. At 1104, search result objects resulting from the search are projected on the web graph to produce a context sensitive projection sub graph. The context sensitive projection sub graph has nodes representing objects containing search result objects that were found in the web graph and edges representing links between nodes. Due to the potentially dynamic nature of the data store, search results objects may not be in the web graph. For example, the internet is a dynamic data store with web pages and domains being added and deleted frequently. As such, a web graph that may have been produced prior or subsequent to a search may not contain search results from domains and web pages created after or before the web graph was produced. A search result object can be related to an object represented by a node in the web graph, for example, by a child relationship or a search result object can be the object represented by a node in the web graph. For example, each node of the web graph representing objects can be a single domain, while each search result object is a single web page. Each domain can be comprised of several web pages. In an another example, each node of the web graph representing objects can be a single web page, while each search result object is also a single web page.

Given the typical distance between search result objects, the context sensitive projection sub graph produced can include disconnected nodes that do not have any edges to other connected nodes in the sub graph. A connected node has at least one edge connecting it directly to another connected node in the sub graph. At 1106, sets of connected nodes are connected by identifying one or more nodes from the web graph that form a path between one set of connected nodes to another set of connected nodes of the context sensitive projection sub graph. In one aspect, nodes and edges that form a shortest path between a set of connected nodes and another set of connected nodes of the context sensitive projection sub graph are employed to produce a context sensitive connection sub graph. The shortest path can be determined by, but is not limited to, the number of nodes along the path. A connection node and edges are added to the sub graph for each node along the path from the web graph that was used to connect a set of connected nodes to another set of connected nodes. A set of connected nodes has connections amongst themselves, but does not have a connection to disconnected nodes or to other sets of connected nodes. Disconnected nodes are also connected to other nodes of the context sensitive projection sub graph by identifying one or more nodes from the web graph that form a path between a disconnected node and a connected node of the context sensitive projection sub graph. In one aspect, nodes and edges that form a shortest path between a disconnected node and a connected node of the context sensitive projection sub graph are employed to produce a context sensitive connection sub graph. The shortest path can be determined by, but is not limited to, the number of nodes along the path. A connection node and edges are added to the sub graph for each node along the path from the web graph that was used to connect a disconnected node to a connected node. When all disconnected nodes and sets of connected nodes have been connected by at least one edge, the resulting sub graph is a context sensitive connection sub graph.

At 1108, graphical properties describing the context sensitive projection sub graph and/or context sensitive connection sub graph are generated. Table 2 above provides some examples of possible graphical properties extracted from a context sensitive projection sub graph and context sensitive connection sub graph along with some features from the query. The features are grouped into four groups: Query features, F-Query, represent non-graphical properties of the results set; Context sensitive projection sub graph features, GF-PROJ, representing various aspects of the nodes and connectivity of the sub graph, Context sensitive connection sub graph features, GF-CONN, representing various aspects of nodes and connectivity of the sub graph, along with their relation to nodes of the context sensitive projection sub graph and connection nodes; and combination features, GF-COMB, representing combined features from the query, context sensitive projection sub graph, and context sensitive connection sub graph.

At 1110, a prediction is generated related to the query or query results based upon the graphical properties of the sub graphs. In an aspect, a predictive model can be employed that has been trained based upon at least one of features of previous queries, graphical properties of sub graphs of previous query results, human or system judgments of previous query results, or observation of previous human or system query reformulations, or any combination thereof. The predictive model can include, but is not limited to, expert systems, case based reasoning, behavior based artificial intelligence, evolutionary computation, classifiers, a statistical model, a probabilistic model, a neural network, a decision tree, a hidden Markov model, a support vector machine, fuzzy logic, a Bayesian classifier, or any combination thereof. The prediction can relate, but is not limited to, the quality of the query results and query reformulations. The quality of the query results can be indicated by any appropriate ranking system, such as numerical, alpha, or alpha-numeric, rank ordered, ranges, classification, or by any other quantitative or qualitative measure. Query reformulation can relate, but is not limited, to whether a query reformulation will be more specialized or generalized, whether a related or completely different query is needed, if a query reformulation is needed, or predicting one or more query reformulations. Specialized meaning a narrowing of the query and generalized meaning a broadening of the query. The prediction can, but is not limited, to being stored, being presented to the user via a human sensory receptor, such as visually, aurally, or physically by an appropriate device, or being employed by an application locally or remotely.

Figure 12:
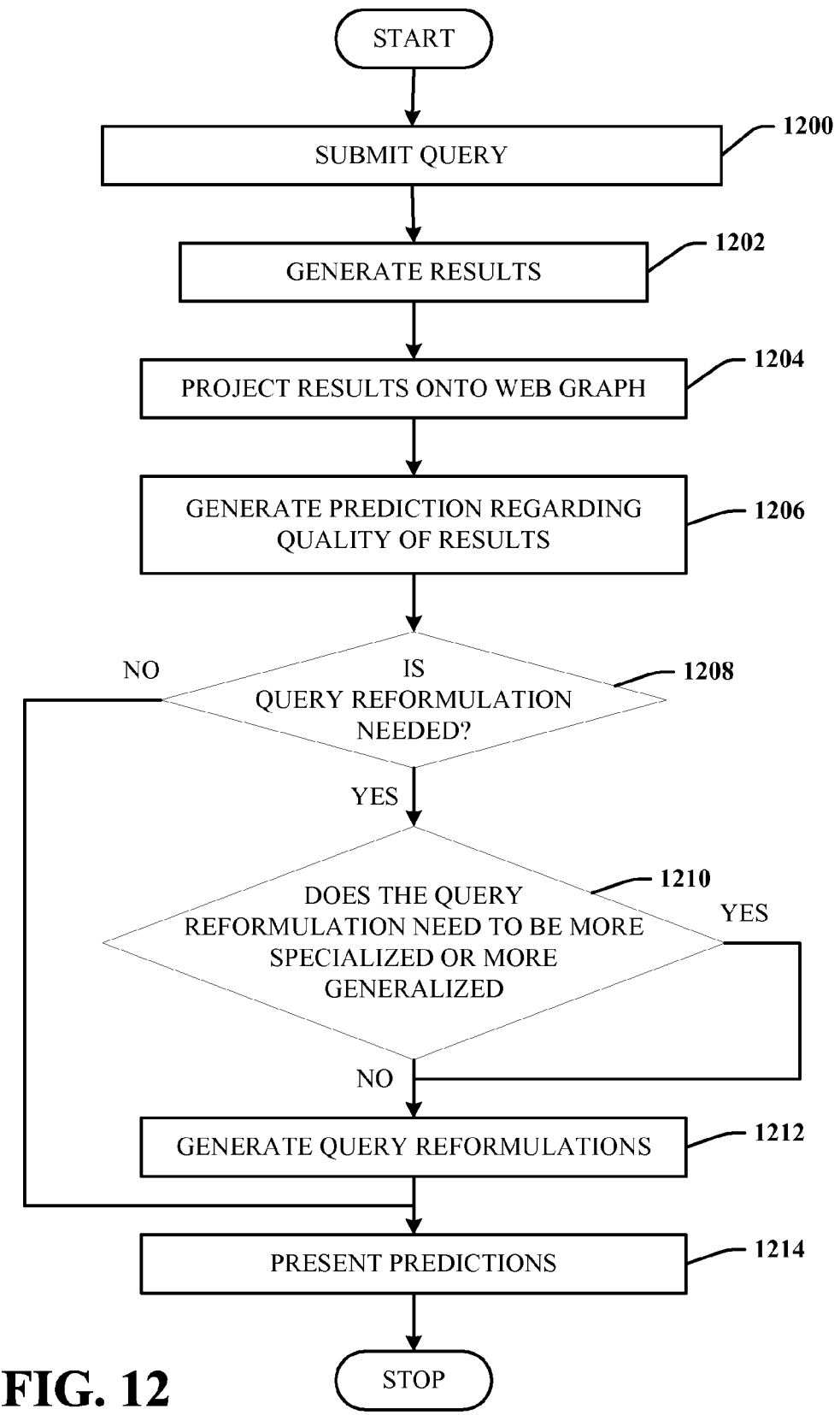
FIG. 12 illustrates a flow diagram of a methodology for employing web projections to predict query reformulations.

FIG. 12 illustrates one embodiment employing a web projection methodology in relation to query reformulation. At 1200, a query is submitted by a user or system. At 1202, results are generated for the submitted query. At 1204, the query results are projected onto a web graph to produce one or more sub graphs. The one or more sub graph can be a context sensitive projection graph and/or a context sensitive connection graph. At 1206 a quality assessment of the query results is generated based upon graphical properties of the one or more sub graphs. At 1208, a prediction is made as to whether a query information reformulation is needed. The determination whether a query reformulation is needed can be, for example, based upon the quality assessment of the query results or on graphical properties of the one or more sub graphs. If a query reformulation is not needed, the methodology proceeds to 1214. If a query reformulation sy is needed, at 1210 a prediction is made as to whether the query reformulation needs to be more specialized or more generalized. The determination whether a query reformulation should be more specialized or more generalized can be, for example, based upon the quality assessment of the query results or on graphical properties of the one or more sub graphs. At 1212, one or more query reformulations are generated. The query reformulations can be, for example, based upon the quality assessment of the query results, on graphical properties of the one or more sub graphs, on the submitted query, a lexicon, or any combination thereof. For example, the query reformulation can be based upon the top 5 query results. The query can be reformulated using any well known query reformulation techniques by those skilled within the art, such as natural language processing or log analysis. At 1214, the prediction is presented to the user or system that submitted the query, or any other user or system. For example, ranked results can be presented to the user along with recommended query reformulations on a display device.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one-step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors that the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) can be derived from another class (called a base class, parent class, etc.), where the subclass inherits the data attributes and methods of the base class. The subclass can specialize the base class by adding code which overrides the data and/or methods of the base class, or which adds new data attributes and methods. Thus, inheritance represents a mechanism by which abstractions are made increasingly concrete as subclasses are created for greater levels of specialization.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter can be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 13:
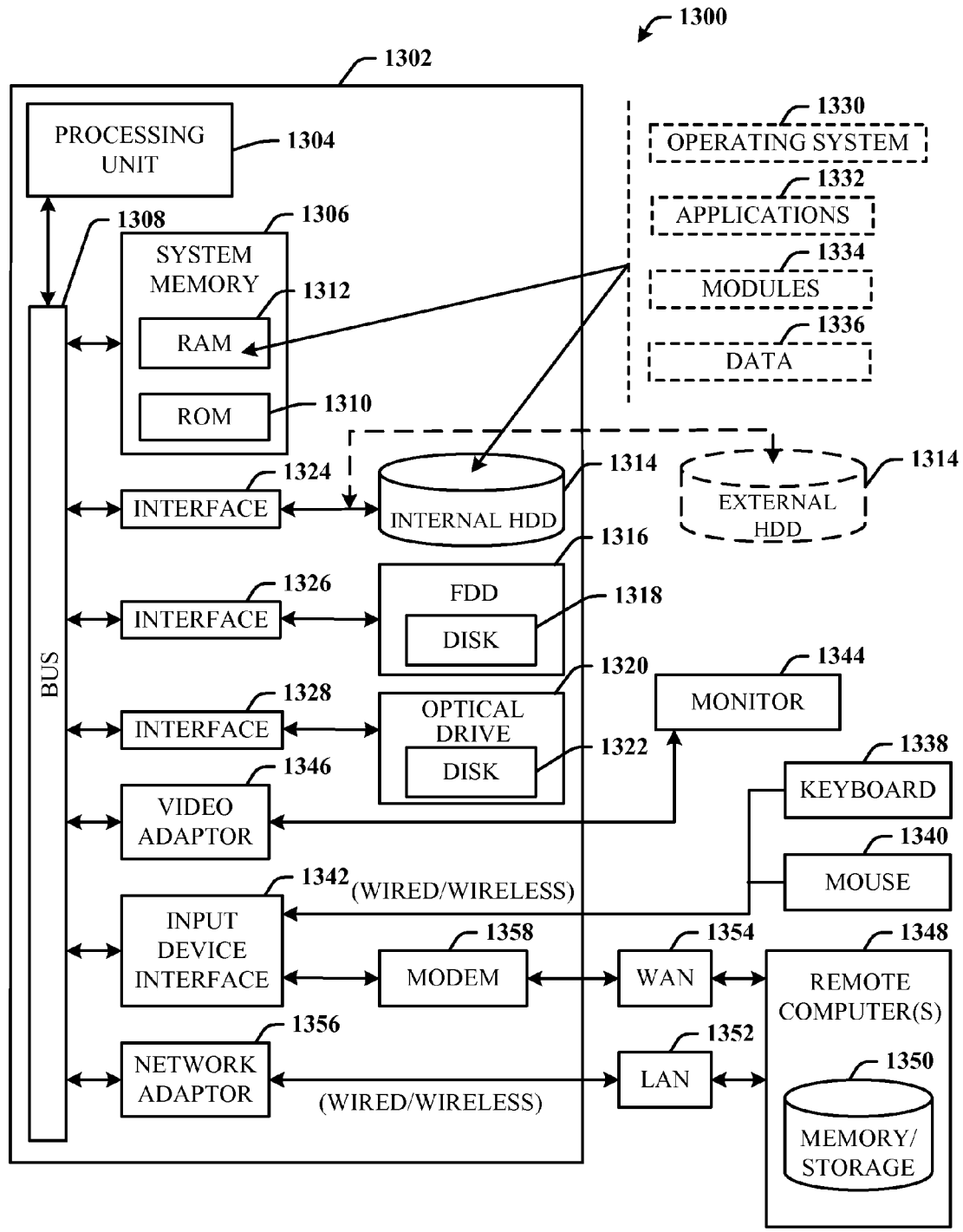
FIG. 13 illustrates a block diagram of a computer operable to execute the disclosed web projection based prediction system.

Referring now to FIG. 13, there is illustrated a block diagram of a computer operable to execute the disclosed system. In order to provide additional context for various aspects thereof, FIG. 13 and the following discussion are intended to provide a brief, general description of a suitable computing environment 1300 in which the various aspects of the claimed subject matter can be implemented. While the description above is in the general context of computer-executable instructions that can run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 13, the exemplary environment 1300 for implementing various aspects includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a nonvolatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosed and claimed subject matter.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is to be appreciated that the claimed subject matter can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) can include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 is connected to the local network 1352 through a wired and/or wireless communication network interface or adapter 1356. The adaptor 1356 can facilitate wired or wireless communication to the LAN 1352, which can also include a wireless access point disposed thereon for communicating with the wireless adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11 g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 14:
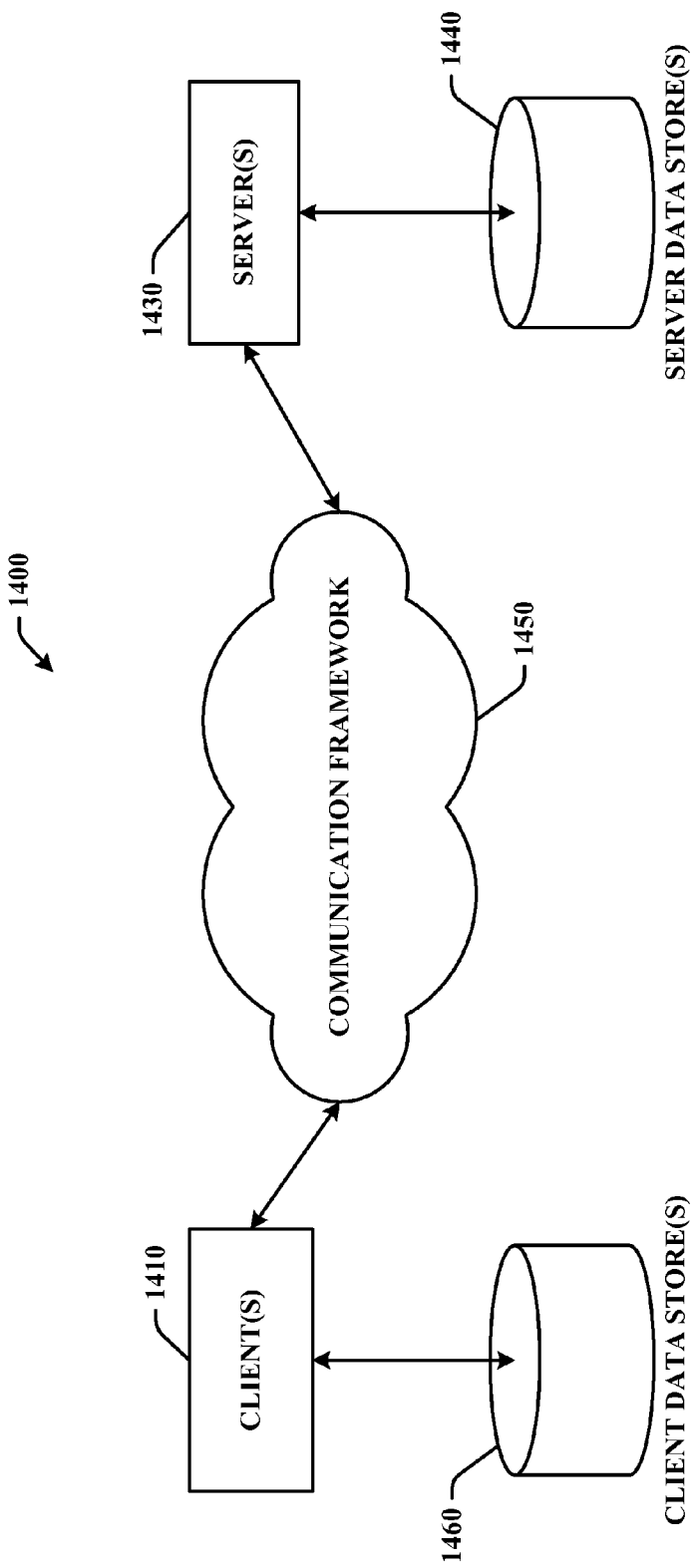
FIG. 14 illustrates a schematic block diagram of an exemplary computing environment for execute the disclosed web projection based prediction system in accordance with another aspect.

Referring now to FIG. 14, there is illustrated a schematic block diagram of an exemplary computing environment 1400 for processing the inference-based query completion architecture in accordance with another aspect. The system 1400 includes one or more client(s) 1402. The client(s) 1402 can be hardware and/or software (e.g., threads, processes, computing devices). The client(s) 1402 can house cookie(s) and/or associated contextual information by employing the claimed subject matter, for example.

The system 1400 also includes one or more server(s) 1404. The server(s) 1404 can also be hardware and/or software (e.g., threads, processes, computing devices). The servers 1404 can house threads to perform transformations by employing the claimed subject matter, for example. One possible communication between a client 1402 and a server 1404 can be in the form of a data packet adapted to be transmitted between two or more computer processes. The data packet can include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

EXPERIMENTAL RESULTS

Throughout the discussion below, experimental results based on exemplary training sets of data are presented to further support or illustrate various aspects of the subject application. It should be appreciated and understood that such experiments are not intended to limit the scope of the systems and methods described herein to particular scenarios, operating conditions or applications but are provided as examples. Moreover, the subject application can be employed with respect to any type of searching performed on the Internet, on a remote or local server, storage facility, or on any computing device or network.

We now describe the details of constructing case libraries of topological properties that characterize the projections of queries onto the web graph. We used two different representations of the web as a graph. Given the representations, we considered constructing projections from nearly 30 thousand queries, each with a corresponding set of search results. Most of the search results were labeled with a human-assigned relevancy score. For our study of query reformulations, we employed a set of 42 million query-to-query transitions with corresponding lists of search results generated at each step in the search session.

First, we present the web graphs that provided the substrate for the query-focused projections. We use two variants of the web graph: a URL graph and a domain graph.

URL graphs provide a representation of the web as a directed graph. Nodes represent web pages, and there is a directed edge from node u to node v if there is a hyperlink from webpage u to a webpage v. We created our web graph based on a sample of 22 million web pages from a crawl of the web performed in March 2006. We use a sample of the web considered to be of high quality. We started crawling from a seed set of popular, high quality web pages with good reputation. The graph contains 345 million edges and is well connected; the largest weakly connected component contains 21 million nodes, while the second largest has less than a thousand nodes. The strongly connected component is also large, containing 14 million nodes. The second largest component has 7000 nodes. The graph has diameter of 8, and node degrees follow a power-law distribution.

For some of our prediction tasks, we are interested in sub-sets of these URLs, e.g., those for which we have human relevance judgments. When we project the URLs tagged with relevance judgments onto this URL graph, results may be missing. URLs may be absent for several reasons, including the limited nature of the sample of URLs that we worked with, changes in pages that are returned and judged over time, and the volatile nature of dynamically generated pages. For some tasks (e.g., predicting the top 20 versus bottom 20 results set), the difference in coverage alone can be a good predictor of class. As we wanted to focus more on the graphical properties than on coverage per se, we normalized the number of projected results in the graph for the different classes. We did this by first noting how many URLs were in the top 20 results, then considering as many results as needed from the bottom to get the same level of coverage.

In the domain graph, nodes represent domain names (e.g, cmu.edu or microsoft.com), and there is a directed edge from node u to node v, if there is a webpage inside domain u that contains a hyperlink to a webpage inside domain v. It is important to note that nodes in a domain graph are not arbitrary domains; all sub-domains are collapsed into a second-level domain name. For example, web pages from domains cs.cmu.edu, ml.cmu.edu, and lti.cs.cmu.edu are merged into a single node (domain name) cmu.edu.

We considered a complete domain graph of the web from February 2006. The graph contains 39 million domain names and 720 million directed edges. The graph is densely connected, has a diameter of 4, and the largest component contains 99.9% of the nodes. Since this is a complete domain graph we have no problems with projection coverage. Basically, the domain of every search result in our dataset can be found in this graph.

In an example, projecting the top 20 results for the query encyclopedia on URL and the domain graph shows greater density in the domain graph. Domain graph projections are usually denser and much better connected. Domain graphs also have better coverage of the search results, with very few missing nodes.

In one application we explored the use of the web-projection methodology for the task of predicting the quality of a set of search results. For this task, we need some known measures of result quality, which we obtained from human judges. For each query the top k results from one or more systems were presented to the judges for evaluation. The quality of a query-result pair was explicitly labeled by the judges using a six point scale ranging from "Perfect" to "Irrelevant". We note that the labeling was performed over the results already highly ranked by a web search engine, which corresponds to a typical user experience, that is limited to the small number of the highly ranked results for a typical web search query. For our experiments we focused on a set of almost 13,000 queries for which we had at least 40 rated results, with an average of 57 results (URLs) and 46 domains per query.

In our second application we were interested in patterns of query reformulation. To study this we obtained query-query transitions, representing reformulations of queries during search sessions. We examined a sample of query logs from a popular web search engine over about 6 week period. For each query $q_i$, we measured $n_i$, the number of times the query was observed. For a pair of queries ($q_i$, $q_j$), we also measured the probability of reformulation or transition from query i to j, $p_{ij}$. If we let $n_{ij}$ be the number of times that $q_i$ was followed by $q_j$ within a thirty-minute window, then $p_{ij}=n_{ij}/n_i$ is the probability of $q_i$ being followed by $q_j$. And similarly, probability $p_i$ of query $q_i$ participating in a transition is defined as $p_i=\Sigma_j n_{ij}/n_i$.

We started with a set of 35 million queries and 80 million query transitions as defined above. For the analysis described below, we considered only queries and reformulations that appeared at least 10 times in our corpus. Thus our analyses used 48,458 queries and 120,914 query transitions. We then used the top 20 search results for each of the 48 thousand queries and projected them on the URL and the domain graphs.

For predicting the quality of search results, we ask the following questions: By analyzing the projection of a query onto the web graph, what can we tell about the quality of the returned result set? What can we tell about the difficulty of the query? More specifically, we explore the following two tasks:
1. Discriminate good (top 20) versus poor (bottom 20) search result sets.
2. Given a set of results, predict how good is the set, i.e., predict the highest human relevancy rating in the set of search results.

We start by describing the problem setting and experimental setup as well as the baseline method.

We focus on opportunities with investigating the following general setting: We are given a query $q_i$ with a set of search results $S_i$. Each query $q_i$ belongs to class $y_i$. A class is a categorical value that can be, as an example, the rating of the most relevant search result in the set, or an indicator of whether the result set $S_i$ is composed of the top-ranked or bottom-ranked search results.

We start with $S_i$ and project it on both the URL and the domain graphs, create both projection and connection graphs, and extract the attributes. This means that we project every query $q_i$ onto two different graphs of the web, and for each projection, we extract a set of features as defined in table 1. We generate a case library of training examples $q_i$ described with features and we learn a model to predict class $y_i$ via a machine learning procedure.

For learning the models we used the WinMine toolkit that uses the GES algorithm in Bayesian structure search to learn a Bayesian network. We model the continuous features as Gaussians and discrete features with a multinomial distribution. For all experiments we report the average classification accuracy over a 10-fold cross validation.

We compare the predictive power of the learned models with two baseline methods. The first baseline model is the marginal model, which predicts the most common class. The second baseline algorithm we use is based on a ranking algorithm that uses a large number of textual and global graph features to rank search results. For the classification tasks we learn a threshold on the score to predict the class.

The baseline ranking algorithm that we used is RankNet, a supervised machine-learning technique developed to learn a ranking function. The learning methodology is a neural net algorithm that optimizes feature weights to best match explicitly provided pair wise user preferences. To train RankNet, over 350 input features are used. These features include various aspects of document content, anchor text features, and basic hyperlink features. The output of RankNet is used to rank results. The intuition is that higher quality search result will typically be assigned higher values of the RankNet weight. Since this single number is a combination of features for ranking, we use it as very powerful feature that serves as input to the Bayesian network classifier. This represents a strong baseline.

The first task we consider is the classification of good (top 20) versus poor (bottom 20) result sets. For this task we used the explicit relevance judgments described above. For each query we order the search results from best to worst using the human judgments. (It is important to note that this ordering can be different than the output of the search engine.)

We then project the top 20 search results, and bottom 20 results ordered by human judgments onto the URL and domain graphs, and compute the features described in table 1 for the two graphs. We learn a model that can predict, for a previously unseen query with a set of search results, whether it is good (top 20) or poor (bottom 20). Given the average number of judged search results per query, we are effectively learning to discriminate the top 20 results versus the search results with ranks 40 to 60. Note that this task involves predicting the relative quality of results for a given query. We next examine predicting the absolute quality of the results.

When we look at examples of projections of good and poor result sets for the query underworld on the domain graph, immediately we can see that results in a good set are tightly clustered, while those in the poor result set are more spread around, and many connection nodes are needed to connect the components of the projection graph. We also notice that the results marked by humans as most relevant appear as the central (high-degree) nodes in the graph. Similarly, when looking at an example of good and poor result sets for query Wisconsin projected on the URL graph, results connect to the most relevant node in the good result set, while, the connector nodes represent the core of the network in the poor result.

TABLE 2

Classification accuracy for predicting good versus poor result sets.

| Feature set | URL graph | Domain graph |
|---|---|---|
| Baseline-Marginals | 0.50 | 0.50 |
| Baseline-RankNet | 0.74 | 0.74 |
| GF-PROJ | 0.62 | 0.82 |
| GF-CONN | 0.60 | 0.86 |
| GF-PROJ + GF-CONN | 0.87 | 0.90 |
| GF-ALL | 0.88 | 0.88 |

Table 2 shows the results for the task of predicting good versus poor result sets using several different methods and feature sets. Results are shown separately for projecting on the URL and the domain graph.

The Baseline-Marginals row displays the classification accuracy of predicting the most common class. Baseline-RankNet is the second baseline where only the RankNet score is used for learning. Essentially this means we are using a combination of about 350 textual features to discriminate the good and the poor result sets. GF-PROJ uses the 11 features extracted from the projection graph, GF-CONN uses the 16 connection graph features, GF-PROJ+GF-CONN uses both of these feature sets (27 features), and GF-ALL refers the case where all 55 features, most of which are de-scribed in table 1, are used for learning.

Not surprising, both RankNet and the new graphical features outperform the marginal baseline. RankNet results reflect the extent to which human judgments agree with the output of the learned ranking function. The "GF-" results reflect the extent to which graphical features of the results subset are predictive of human relevance judgments. For the URL graph, the RankNet baseline outperforms models trained only on projection or connection graph features, but the models trained on both sets of features shows substantial improvement over RankNet (18% relative improvement). For the domain graph, all models trained on graphical features outperform RankNet. We obtain the best classification accuracy of 90% when combining projection and connection graph features. Also notice that we get higher classification accuracy when projecting on the domain graph. This is likely due to the lower coverage of the URL graph.

It is important to note that the "GF-" models use only graphical features and do not take into account any content matches between the query and web pages. The fact that they perform well by themselves is quite interesting.

In an example representing a simple model learned from the query projections on the domain graph using the GF-PROJ feature set. The model has cross validation classification accuracy of 0.82. The model comprises decision tree for the output variable Top 20 vs. Bottom 20, wherein Nodes correspond to input features, and each leaf node shows the probability distribution for the output variable which is shown as a histogram. In this case, the variable has only two possible values; the proportion of good (top 20) sets and the poor (bottom 20) sets.

The projection graphs of good result sets have few isolated nodes (low values of PrG:Deg0Nodes) and results are coming from a few domains (low values of PrG:Nodes). On the other hand poor result sets have many domains and many isolated nodes.

Above, we considered the problem of discriminating between the good and poor result sets. Now we focus only on top-rated (top 20) results for each query, and aim to predict the absolute quality of a query result set. More specifically, we label each query with the highest human assigned rating for any result in the set. We note that we could use other measures to summarize the quality of result sets. The highest human rating is easy to describe and one of practical importance. Since the human relevance judgments were on a 6-point scale, we can examine the problem at several granularities. Here, we present results for the 6-class problem (predict top label exactly) and the 2-class problem (predict whether the top label is from the three highest or three lowest rating categories).

TABLE 3

Result set quality classification accuracy for a 6-way classification problem.

| Feature set | URL graph | Domain graph |
|---|---|---|
| Baseline-Marginals | 0.36 | 0.36 |
| Baseline-RankNet | 0.48 | 0.44 |
| GF-PROJ | 0.51 | 0.53 |
| GF-CONN | 0.50 | 0.52 |
| GF-PROJ + GF-CONN | 0.54 | 0.54 |
| GF-ALL | 0.55 | 0.55 |

First, we consider the 6-class task of predicting the exact rating of the highest rated document in the set of top 20 results. Table 3 shows the classification results. For the URL graph we get 15% relative improvement over using the RankNet to predict the quality when using all attributes. For the domain graph the improvement is even larger, 25%. Note that all methods using any combination of graphical attributes outperform both baseline methods.

The model for the 6-level result set quality classification problem is more complex. First split is on the node ratio of projection and connection graphs. If connection graph is much larger than the projection graph, results are bad quality. Next, if maximum degree in a graph is relatively small, we get medium quality results, with results getting worse as the number of domains in a top 20 set increases. Good quality search result sets have projection nodes with large degrees, results come from few domains, have small domains to URL ratio, and are well connected.

TABLE 4

Result set quality classification accuracy for a binary classification problem.

| Feature set | URL graph | Domain graph |
|---|---|---|
| Baseline-Marginals | 0.55 | 0.55 |
| Baseline-RankNet | 0.63 | 0.60 |
| GF-PROJ | 0.80 | 0.64 |
| GF-CONN | 0.79 | 0.66 |
| GF-PROJ + GF-CONN | 0.82 | 0.69 |
| GF-ALL | 0.83 | 0.71 |

Next, we examine the same problem at coarser granularity. The task is to predict whether the set contains a result with the rating in the top or the bottom half of the 6 point rating scale. Table 4 shows the classification accuracies for the classification problem. Notice the difference in performance between the domain and URL graph projections increased even further and the relative increase in performance over the RankNet baseline is now even higher (31% for the URL and 18% for the domain graph).

This task is similar to that of discriminating the good versus poor result sets. However, it is also harder since we are only working with top 20 results for each query and predicting the absolute quality of the set. The good versus poor prediction requires only a relative judgment.

For the task of distinguishing good versus poor result sets, we saw that projections on the domain graph outperformed the projections on the URL graph. For the case of predicting the exact quality of a result set, the projections on the URL graph generally performed better even in cases where the URL graph has the problems with coverage. This may be explained by the difference in the goals and representation. For good versus poor discriminations the quality of the whole set is important and the domain graph likely rep-resents an appropriate level of abstraction for handling this challenge. In contrast, the quality of a result set is a single result (a single node) property. Here the domain graph may be too coarse to capture fine-grained properties of the high quality nodes (search results). A projection to the URL graph may be needed to capture necessary properties.

As a second illustration of the use of web projections, we explore the learning of models to predict query-reformulation behavior and characteristics. Web searchers often refine on their queries one or more times, as they seek information on the web. Prior research has explored query reformulations, considering such issues as the timing and type of reformulation seen. For example, building models to predict the likelihood that searchers will specialize, generalize, or reformulate queries more dramatically within a search session, considering the history and timing of actions, by examining substitutions that searchers make to their queries.

We explore the use of web projections to build models that predict if and how users reformulate their queries. We used the set of 48 thousand queries that were reformulated at least 10 times. For every query, we took the top 20 search results returned by the search engine, and created the query projection and connection graphs, extracted the graph features and trained predictive models.

In summary, we consider the following tasks:
1. Distinguish queries with high versus low reformulation probability.
2. Given a transition from query $q_s$ to query $q_d$, predict whether it is a specialization or generalization.
3. Given a query that is likely to be reformulated, predict whether it is going to be generalized or specialized.

Next, we describe the experimental setup and give more detailed description of our results and findings. Using the query reformulation data described above, we defined several binary classification tasks. For each selected query, we took the top 20 search results as returned by the search engine, projected them on the domain and URL graphs and extracted the features. For some of the tasks the training datasets were very imbalanced so that one outcome was much more likely than the other. In order to focus on the key discriminations rather than basic marginal frequencies, we sub-sampled the majority class, so that both classes had roughly the same number of training examples.

First, we considered the problem of learning whether a query is likely to be reformulated or not. We split our set of queries into two classes: queries with high reformulation probability ($p_r$~0.6), and queries with low reformulation probability ($p_r$~0.15). We chose this value so that the two classes were about the same size.

TABLE 5

Classification accuracy of predicting whether the query is likely to be reformulated

| Feature set | URL graph | Domain graph |
|---|---|---|
| Baseline-Marginals | 0.54 | 0.56 |
| GF-PROJ | 0.59 | 0.58 |
| GF-CONN | 0.63 | 0.59 |
| GF-PROJ + GF-CONN | 0.63 | 0.60 |
| GF-ALL | 0.71 | 0.67 |

Table 5 shows the classification accuracies when projecting on URL and domain graphs. First notice that we get gradual improvement with increasing numbers of features. Note also that using features from the projection on the URL graph gives better performance than projections on the domain graph. We note the baselines for predicting the most common class are different between the URL and the domain graph as few queries produced very small URL projection graphs, and we discarded those queries.

Examining the model we see that, queries that are likely to get reformulated come from many domains, are generally longer, and have high degree (>4) connection nodes. This again shows that queries whose results are tightly knit together on the web are of higher quality (in the sense that they are not reformulated). It also shows that result sets with central high degree nodes and a small number of connector nodes are of higher quality.

We also explored transitions between queries. For this task, we took pairs of queries where there is a strong tendency of transition in only one direction, and then trained a model that learns whether a given query is likely to be the source or destination of the transition.

With about 85% classification accuracy our models were able to predict whether a given query is a source or a destination of the transition. The learned model was also interesting. We saw that sources of query transitions have many isolated nodes, short query strings, projection graph with many connected components, and projection nodes that lie far apart in connection graph. On the other hand, reformulation destinations are better connected and tighter. Also, the in-degree of projection nodes is higher. Intuitively these results make sense since one probably wants to specify a new query if the search results are somewhat "random", i.e. scattered around on the web. These encouraging results led to the next question we explore.

As was just shown we can reliably learn whether a given query is the source or destination of a reformulation. Now, we are interested in predicting the nature of the reformulation. An interesting distinction is whether the reformulation is a specialization or a generalization of the source query. Thus, given a pair of queries where $q_s$ is often reformulated into $q_d$ we want to learn characteristics of projection graphs for queries that are specialized versus generalized.

For this work we simply define query specialization as adding more words to the existing query, and similarly define generalization as removing words from the query. Given the query transition data, we extracted all pairs of queries where there was a specialization or generalization transition that had occurred at least 10 times. Then we separately projected the source $q_s$ and the destination query $q_d$, and extracted the features. Then we created transition features by simply taking the difference of the corresponding feature values: $F_i(q_s)-F_i(q_d)$, where $F_i(\ )$ denotes $i^{th}$ feature. Note that in this experiment we do not use the query text attributes (length of the query string) as we can directly identify the type of transition by the change in the length of the query.

TABLE 6

Classification accuracy of predicting whether a given query transition is a specialization or a generalization

| Feature set | URL graph | Domain graph |
| --- | --- | --- |
| Baseline-Marginals | 0.50 | 0.50 |
| GF-PROJ | 0.71 | 0.84 |
| GF-CONN | 0.69 | 0.83 |
| GF-PROJ + GF-CONN | 0.71 | 0.85 |
| GF-ALL | 0.80 | 0.87 |

We show the classification result in table 6. Here, using only the projection graph features performs better than using solely the connection graph features. We see consistent increase in performance by combining the projection graph and derived features. We obtain the accuracy of 87% using projection on domain graph and all features for learning.

The learned model for reformulation using GF-PROJ+GF-CONN features with projections on the URL graph is rather complex. Note that the splitting criteria (e.g., GpComponents) here is not the value of the attribute but rather the change in attribute value, i.e., the difference in the attribute values of the source and the destination of the transition. The model shows that query generalizations are characterized by larger numbers of connected components of projection graph (first split of the tree). It also shows that the number of nodes and edges in the projection graph is larger for generalizations. For specializations we see that the number of isolated nodes is lower, results are gathered in few connected components and the size of largest connected component is larger, while the number of connector nodes is lower. These results correspond with the intuition that when generalizing the query the list of results will get richer and more diverse. This also means that the resulting projection graph will be sparser, and disconnected. Query specializations lead to the opposite effect—the graph is concentrated, denser, and fewer connector nodes are needed to connect it.

Additionally, we examine a type of reformulation that a query is likely to execute. We seek to predict whether it is more likely to see specific queries generalized or specialized, and how this reflects on the properties of the query projections. We learn models that consider specific properties of queries that are reformulated in a certain way. Again, we do not use the features derived from the query string (length of the query, number of words, etc.) as the change in the length of the query provides information about the type of reformulation.

TABLE 7

Classification accuracy of predicting whether a reformulation will likely lead to a specialization or generalization.

| Feature set | URL graph | Domain graph |
| --- | --- | --- |
| Baseline-Marginals | 0.50 | 0.50 |
| GF-PROJ | 0.71 | 0.68 |
| GF-CONN | 0.62 | 0.65 |
| GF-PROJ + GF-CONN | 0.70 | 0.68 |
| GF-ALL | 0.78 | 0.76 |

Table 7 gives the classification results. The performance of the URL and domain graph projections is about the same. The projection graph gives much better performance than using only the features of connection graph. Using all features we get a good classification performance of 78%.

This time the resulting model is simpler and more intuitive. We see that the maximum degree of a node in projection graph is the most important attribute. If the maximum degree is low, the query is likely to get specialized. This means that, if there is no central node in the projection graph, the user will specialize the query. On the other hand generalizations occur when the largest connected component of projection graph is large (more than 10 nodes, for top 20 results), and nodes are close together (low average path length in connector graph).

Our experimental results for two different problem domains demonstrate the potential of using contextual sub-graphs for search-related tasks. By using a rich set of graphical characteristics of search results (based on their projection in the larger web graph), we can predict the quality of results set quality and characteristics of user's query reformulations.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for analyzing one or more objects of interest within a context comprising:
   one or more processors configured with executable instructions to instantiate a web projection component and an inference component;
   the web projection component configured to project the one or more objects of interest onto a web graph to produce one or more sub graphs, the web projection component producing the one or more sub graphs by adding connection nodes and edges between a largest set of connected nodes and a second largest set of connected nodes; and
   the inference component configured to make an inference related to at least one of the context or the one or more objects of interest, the inference based upon graphical properties of the one or more sub graphs.

2. The system of claim 1, wherein the context delineates the one or more objects of interest from a larger set of objects in a data store.

3. The system of claim 2, wherein the context is one of defined by one or more users, defined by one or more systems, or inferred by the system.

4. The system of claim 2, wherein the context is at least one of results from a user or system query, objects a user has previously viewed, pages on a website, newly added objects, objects above or below an occurrence threshold, objects that have recently changed, objects linked to a particular object, or objects downloaded within a period of time.

5. The system of claim 2, wherein the web graph comprises nodes representing objects from the data store and edges between nodes representing associations between objects.

6. The system of claim 1, wherein the one or more sub graphs are at least one of a context sensitive projection sub graph or a context sensitive connection sub graph.

7. The system of claim 6, wherein the context sensitive projection sub graph comprises nodes representing nodes from the web graph, wherein each node contains at least one object from the one or more objects of interest, the context sensitive projection sub graph further comprises edges representing edges between nodes from the web graph that contain at least one object from the one or more objects of interest.

8. The system of claim 7, wherein the context sensitive connection sub graph comprises all nodes and edges from the context sensitive projection graph, along with a minimal set of edges and connection nodes to connect all nodes.

9. The system of claim 8, wherein the graphical properties are based upon at least one of an individual sub graph, or a plurality of sub graphs, wherein the graphical properties are further based at least on one of nodes, edges, paths, connected components, connector nodes, path shape, path length, node ratio, edge ratio, path ratio, clustering coefficient, node degree, node density, edge density, or node size.

10. The system of claim 1, wherein the inference at least one of predicts quality of the one or more objects of interest, predicts an adjustment of the context, or identifies one or more patterns based upon graphical properties of the one or more sub graphs.

11. The system of claim 10, wherein the quality of the one or more objects of interest is associated with individual objects from the one or more objects of interest, a sub set of the one or more objects of interest, or the entire set of one or more objects of interest.

12. The system of claim 10, wherein the quality can be indicated by a numerical ranking, alpha ranking, alpha-numeric ranking, ordered ranking, range, or class.

13. The system of claim 10, wherein predicting an adjustment of the context comprises at least one of predicting whether a context will be narrowed or broadened, whether a related or completely different context is needed, if a context adjustment is needed, or predicting one or more delineation criteria for objects of interest.

14. The system of claim 10, wherein identifying a pattern comprises at least one of identifying clusters, loops, anomalies, linkage patterns, edge density, path length between nodes, and patterns matching or approximating stored reference patterns.

15. A method for analyzing objects of interest within a context comprising:
    controlling one or more processors configured with executable instructions for:
    projecting objects of interest onto a web graph to produce one or more sub graphs, wherein producing the sub graphs comprises:
       ordering sets of connected nodes by size;
       identifying a shortest path between a largest set of connected nodes, from among the ordered sets, to a second largest set of connected nodes, from among the ordered sets;
       adding, according to the shortest path, connection nodes and edges between the largest set of connected nodes and the second largest set of connected nodes; and
       repeating the step of identifying the shortest path and the step of adding connection nodes while more sets of nodes are available in the sets of connected nodes ordered by size; and
    making an inference related to at least one of the context or objects of interest based upon graphical properties of the one or more sub graphs.

16. The method of claim 15, wherein the web graph comprises nodes representing objects from a data store and edges between nodes representing associations between objects.

17. The method of claim 15, wherein projecting objects of interest onto the web graph comprises:
    identifying each node on the web graph that contains an object of interest;
    identifying each edge on the web graph between identified nodes; and
    copying each identified node and each identified edge onto a sub graph.

18. The method of claim 15, wherein making the inference comprises at least one of predicting the quality of the objects of interest, predicting one or more changes to the context, or identifying one or more patterns based upon graphical properties of the one or more sub graphs.

19. A method for analyzing objects of interest within a context comprising:

controlling one or more processors configured with executable instructions for:

projecting objects of interest onto a web graph to produce one or more sub graphs, the projecting of the objects of interest comprising:

identifying each node on the web graph that contains an object of interest;

identifying each edge on the web graph between identified nodes; and copying each identified node and each identified edge onto a sub graph;

making an inference related to at least one of the context or objects of interest based upon graphical properties of the one or more sub graphs;

identifying a shortest path from web graph between the largest set of connected nodes in the sub graph to the second largest set of connected nodes in the sub graph;

adding nodes and edges along the identified shortest path to the sub graph to form a new largest set of connected nodes;

identifying a shortest path from web graph between the new largest set of connected nodes in the sub graph to the second largest set of connected nodes in the sub graph; and adding nodes and edges along the identified shortest path to the sub graph to form a new largest set of connected nodes until all nodes of the sub graph are connected.

* * * * *

UNITED STATES PATENT AND TRADEMARK OFFICE
CERTIFICATE OF CORRECTION

| | | |
|---|---|---|
| PATENT NO. | : 7,970,721 B2 | Page 1 of 1 |
| APPLICATION NO. | : 11/763719 | |
| DATED | : June 28, 2011 | |
| INVENTOR(S) | : Jurij Leskovec et al. | |

It is certified that error appears in the above-identified patent and that said Letters Patent is hereby corrected as shown below:

In column 13, line 43, delete "node" and insert -- nodes --, therefor.

Signed and Sealed this
Twenty-third Day of August, 2011

David J. Kappos
*Director of the United States Patent and Trademark Office*